United States Patent
Tuchman et al.

(10) Patent No.: US 9,647,898 B2
(45) Date of Patent: May 9, 2017

(54) METHOD FOR PROVIDING MEDIA CONTENT USING MULTI-CHANNEL NAVIGATOR AND ROUTE SEQUENCES

(71) Applicants: Kenneth D. Tuchman, Englewood, CO (US); Bruce A. Sharpe, Aurora, CO (US); Henry D. Truong, Chelmsford, MA (US)

(72) Inventors: Kenneth D. Tuchman, Englewood, CO (US); Bruce A. Sharpe, Aurora, CO (US); Henry D. Truong, Chelmsford, MA (US)

(73) Assignee: TELETECH HOLDINGS, INC., Englewood, CO (US)

( * ) Notice: Subject to any disclaimer, the term of this patent is extended or adjusted under 35 U.S.C. 154(b) by 306 days.

(21) Appl. No.: 14/569,613

(22) Filed: Dec. 12, 2014

(65) Prior Publication Data
US 2015/0100889 A1    Apr. 9, 2015

Related U.S. Application Data

(62) Division of application No. 13/407,138, filed on Feb. 28, 2012, now Pat. No. 8,942,369.

(51) Int. Cl.
*G06F 3/0482* (2013.01)
*H04M 5/00* (2006.01)
(Continued)

(52) U.S. Cl.
CPC ............ *H04L 41/22* (2013.01); *G06F 3/0482* (2013.01); *G06F 3/0485* (2013.01);
(Continued)

(58) Field of Classification Search
CPC .. G06F 3/0482; G06F 3/0481; G06F 3/04842; G06F 3/0484; H04M 15/06; H04M 3/42314; H04M 3/436; H04L 41/22
(Continued)

(56) References Cited

U.S. PATENT DOCUMENTS 6,212,178 B1    4/2001  Beck et al.
6,226,623 B1    5/2001  Schein et al.
(Continued)

FOREIGN PATENT DOCUMENTS

EP        1246086 A2    10/2002

OTHER PUBLICATIONS

EP 13754894.7, Extended European Search Report, Dated Oct. 8, 2015, 6 pages.
(Continued)

*Primary Examiner* — Rasha Al Aubaidi
(74) *Attorney, Agent, or Firm* — Blakely, Sokoloff, Taylor & Zafman LLP

(57) ABSTRACT

An electronic device displays a first row of graphical representations, each corresponding to a context element of a route sequence map of a first user. The route sequence map includes context elements organized in a hierarchical structure, each context element having one or more property values specifying an action to be performed by the server or a link to one or more child context elements in the hierarchical structure. In response to a selection of a first graphical representation from the first row, a first message having at least a first identifier (ID) of the first graphical representation is transmitted to the server. A second message is received from the server in response to the first message, the second message including data identifying a second row of context elements of the route sequence map. The second row is displayed as a child row to the first row.

22 Claims, 19 Drawing Sheets

(51) Int. Cl.
*H04L 12/24* (2006.01)
*H04M 3/523* (2006.01)
*G06F 3/0484* (2013.01)
*G06F 3/0485* (2013.01)
*H04M 3/51* (2006.01)

(52) U.S. Cl.
CPC ...... *G06F 3/04842* (2013.01); *H04M 3/5141* (2013.01); *H04M 3/523* (2013.01); *H04M 2201/38* (2013.01); *H04M 2201/42* (2013.01); *H04M 2201/54* (2013.01); *H04M 2203/2038* (2013.01); *H04M 2203/252* (2013.01); *H04M 2203/408* (2013.01)

(58) Field of Classification Search
USPC ............. 379/201.01, 242, 247; 715/737, 854
See application file for complete search history.

(56) References Cited

U.S. PATENT DOCUMENTS

| | | | |
|---|---|---|---|
| 6,690,788 B1 | 2/2004 | Bauer et al. | |
| 6,819,759 B1 | 11/2004 | Khuc et al. | |
| 6,934,381 B1 | 8/2005 | Klein et al. | |
| 6,988,126 B2 | 1/2006 | Wilcock et al. | |
| 7,165,213 B1 | 1/2007 | Busey | |
| 7,418,092 B2 | 8/2008 | Brown | |
| 7,428,461 B2 | 9/2008 | Ohnishi et al. | |
| 7,450,567 B1 | 11/2008 | Mamnani | |
| 7,496,053 B1 | 2/2009 | Seabaugh | |
| 7,558,382 B2 | 7/2009 | Torres et al. | |
| 7,623,632 B2 | 11/2009 | Bushey et al. | |
| 7,658,327 B2 | 2/2010 | Tuchman et al. | |
| 7,746,362 B2 | 6/2010 | Busey et al. | |
| 7,761,321 B2 | 7/2010 | Kannan et al. | |
| 7,787,609 B1 | 8/2010 | Flockhart et al. | |
| 8,000,454 B1 | 8/2011 | Or-bach et al. | |
| 8,019,693 B2 | 9/2011 | Borg et al. | |
| 8,111,811 B2 | 2/2012 | Chilton et al. | |
| 2006/0171402 A1 | 8/2006 | Moore et al. | |
| 2006/0218061 A1 | 9/2006 | Mouline | |
| 2007/0041523 A1 | 2/2007 | Paden et al. | |
| 2007/0160188 A1 | 7/2007 | Sharpe et al. | |
| 2007/0276722 A1 | 11/2007 | Silvera et al. | |
| 2007/0293200 A1 | 12/2007 | Roundtree et al. | |
| 2008/0074264 A1 | 3/2008 | Sharpe et al. | |
| 2008/0140438 A1 | 6/2008 | Bares | |
| 2008/0195659 A1 | 8/2008 | Rawle | |
| 2009/0044150 A1* | 2/2009 | Liu | G06F 3/0483 715/854 |
| 2010/0030881 A1 | 2/2010 | Moreira Sa de Souza et al. | |
| 2010/0205540 A1 | 8/2010 | Gupta et al. | |

OTHER PUBLICATIONS

"Afaria OneTouch" iAnywhere Solutions, Inc., Dublin, California, 2005, 2 pages.

"Check Point Provides One-Touch Secure Access to Corporate Data for Mobile Workers" CMP Media LLC, Oct. 28, 2010, downloaded from <http://www.darkreading.com/shared/printableArticleSrc.jhtml?artivleID=228000288>, Nov. 10, 2010, 2 pages.

International Search Report and Written Opinion mailed Jun. 25, 2013, for International Patent Application No. PCT/US2013/028193, 12 pages.

* cited by examiner

| Master Context (default) 451 | | |
|---|---|---|
| Property Name | Property Value | Description |
| ChannelType | Chat | Sets chat default |
| ChatSkill | HorizonChat | |
| ChannelType | Voice | Sets voice default |
| VoiceSkill | HorizonVoice | |
| AddSequence | SeqList | Used by "Add" tiles |
| List | True | |

Context Tile

Exit　Save

| I Have A Question 452 | | |
|---|---|---|
| Property Name | Property Value | Description |
| ChannelType | Answer | How do I become a Wells Fargo Customer | IR channel (engine) |
| Question | | Tile question |
| ChannelType | Chat | Tile channel (override) |
| ChatSkill | HorizonChat2 | Tile skill (override) |
| Button | Voice | Master Context (MC) |
| Button | Chat | Uses tile skill (override) |

Action Tile

Exit　Save

FIG. 4D

Mobile Website 453

| Property Name | Property Value | Description |
|---|---|---|
| ChannelType | ExternalResource | Set tile channel |
| Transport | HTTPS | Master Context (MC) |
| Address | www.wf.com | MC override |

Action Tile

[Exit] [Save]

Problem 454

| Property Name | Property Value | Description |
|---|---|---|
| ChannelType | Answer | Set tile channel |
| Question | UserEntered | User entered question |
| ChannelType | Voice | MC override |
| VoiceSkill | HorizonVoice | MC override |
| Button | Chat | Master Context (MC) |
| Button | Voice | MC override |

Action Tile

[Exit] [Save]

FIG. 4E

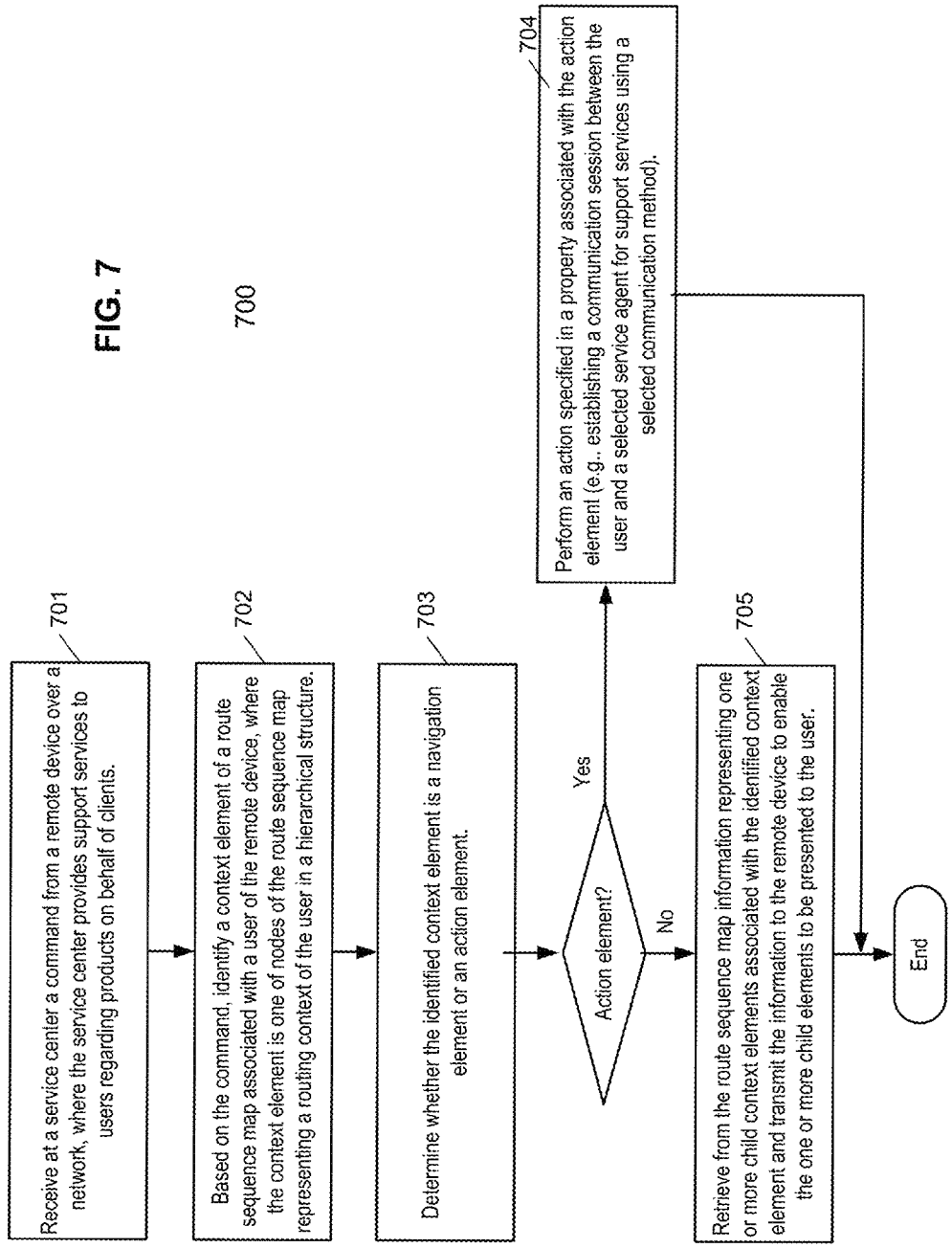

Generated Navigator "Speed Dial" string in XML for use in conveying the context and content of the request:

```xml
<DialInfo>
  <Tile ID="718" Name="">
    <Property Name="First Name">David</Property>
    <Property Name="Last Name">Blatherwick</Property>
  </Tile>
  <Tile ID="738" Name="Wells Fargo">
    <Property Name="VoiceSkill">General Wells Fargo</Property>
    <Property Name="ChatSkill">General WF Chat</Property>
  </Tile>
  <Tile ID="739" Name="Banking">
    <Property Name="VoiceSkill">WF Banking Voice</Property>
    <Property Name="ChatSkill">WF Banking Chat</Property>
  </Tile>
  <Tile ID="740" Name="I Have a Question">
    <Property Name="Launch To">IR</Property>
    <Property Name="Question">How do I get help at Wells Fargo</Property>
  </Tile>
</DialInfo>
```

FIG. 10A

Generated Navigator "Speed Dial" string as a web page service invocation string using a "Rest" model.

http://69.164.155.126/Speedster/Dialer/SpeedDial/Xfinity/PSTN/Voice/+17202812201?DialString=<DialInfo> <Tile ID="718" Name=""> <Property Name="First Name">David</Property> <Property Name="Last Name">Blatherwick</Property> </Tile> <Tile ID="738" Name="Wells Fargo"> <Property Name="VoiceSkill">General Wells Fargo</Property> <Property Name="ChatSkill">General WF Chat</Property> </Tile> <Tile ID="739" Name="Banking"> <Property Name="VoiceSkill">WF Banking Voice</Property> <Property Name="ChatSkill">WF Banking Chat</Property> </Tile> <Tile ID="740" Name="I Have a Question"> <Property Name="Launch To">IR</Property> <Property Name="Question">How do I get help at Wells Fargo</Property> </Tile></DialInfo>

FIG. 10B

METHOD FOR PROVIDING MEDIA CONTENT USING MULTI-CHANNEL NAVIGATOR AND ROUTE SEQUENCES

RELATED APPLICATIONS

This application is a divisional application of U.S. patent application Ser. No. 13/407,138, filed Feb. 28, 2012, which is incorporated by reference herein in its entirety.

FIELD OF THE INVENTION

Embodiments of the present invention relate generally to providing media content. More particularly, embodiments of the invention relate to providing media content using multi-channel navigator and route sequences.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PSTN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill area, level of that skill and/or a schedule of the agent. The number of agents within the contact center and available to the system may often be limited by the physical space available for the agents to operate. Contact centers have to deal with a limited number of agents to handle a large number of incoming customer calls. Typically, when an end user initiates a contact with the service center, the end user has to know or maintain the detailed information regarding how to reach people and/or obtain services from the service center. Often more decisions have to be made at the point in time and sometimes it is time consuming. There has been a lack of user friendly mechanisms to manage such information such that fewer time-consuming decisions are required during the time of contact to obtain the required service.

BRIEF DESCRIPTION OF THE DRAWINGS

Embodiments of the invention are illustrated by way of example and not limitation in the figures of the accompanying drawings in which like references indicate similar elements.

FIGS. 4A-4E are screenshots illustrating a graphical user interface for configuring a route sequence map according to one embodiment of the invention.

FIG. 7 is a flow diagram illustrating a method for navigating resources of a service center based on a route sequence map according to one embodiment of the invention.

FIGS. 10A and 10B are pseudocodes illustrating Web activities according to one embodiment of the invention.

DETAILED DESCRIPTION

Figure 1:
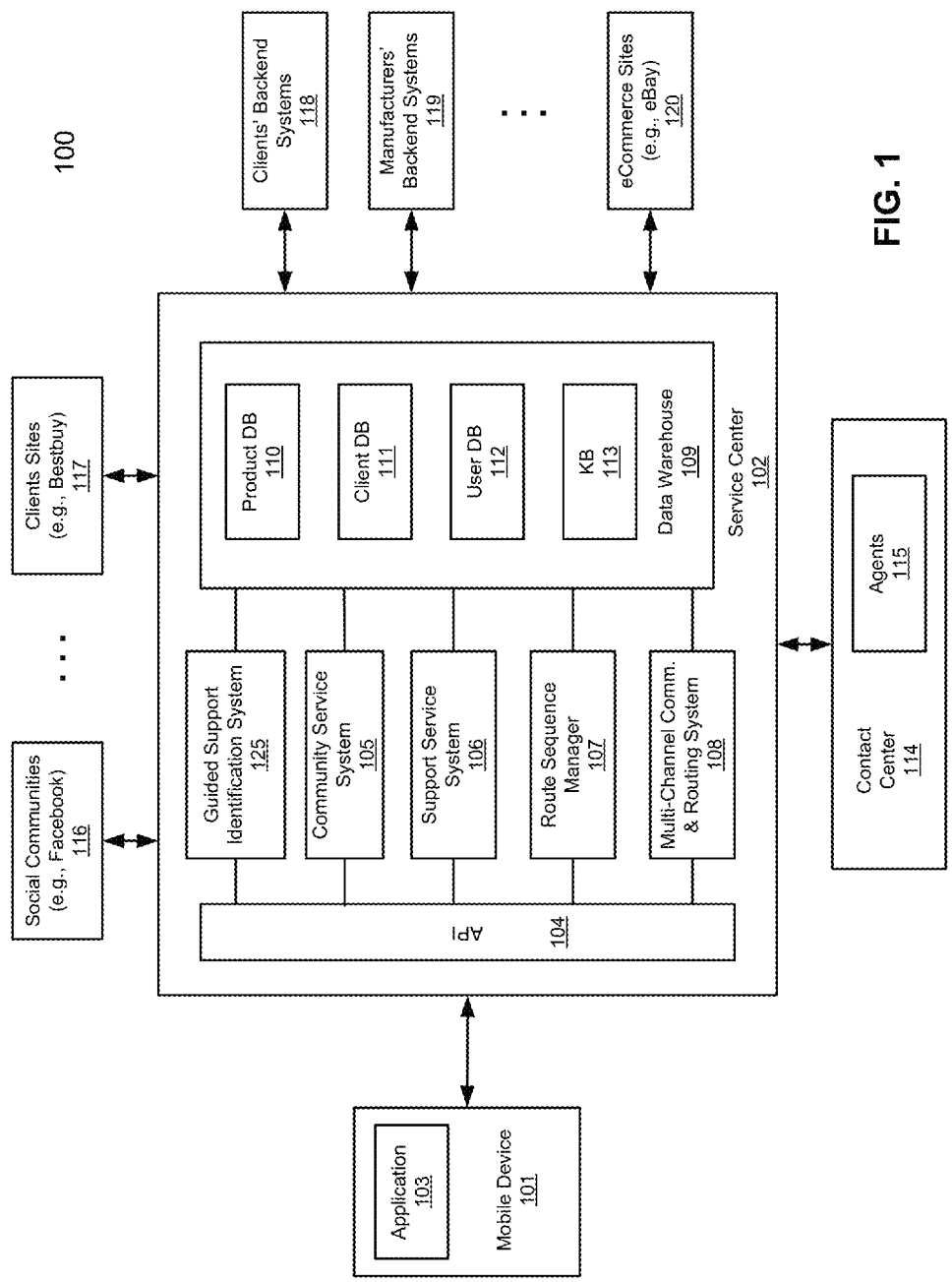
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a platform is provided to allow a user or an administrator to configure a route sequence map to help in guiding a user to navigate through a selection of available resources provided by a service center, such as, obtaining support services from a support service agent concerning a product or service provided by a client of the service center. Resources provided by a service center may also include automated platforms or self-service applications which provide support services to the user. A route sequence map is a collection of route sequences pulled together allowing a variety of operations to be performed via a service center and initiated from a single application. A route sequence map can logically represent a global route context of a user that can lead to a variety of actions performed and/or one or more further route sequences of one or more related subject matters. Once a route sequence map has been configured, a user can initiate from an application from a variety of platforms (e.g., mobile phone, laptop, tablet, and desktop) to navigate or tour the preconfigured resources associated with the route sequence map available from the service center, without having to provide detailed information regarding how to access those resources at runtime. As a result, the user experience with the service center can be greatly enhanced.

According to one embodiment, the service center provides a configuration interface, such as an application programming interface (API), a locally or hosted installed application or a Web-based interface (e.g., Web portal) via a variety of communication protocols, to allow an end user or an administrator of a corporate client to configure and/or create a route sequence map for the end user (e.g., individual persons who choose to create personal or shared navigation maps) or users associated with the corporate client (e.g., employees of a corporation and/or buyers of products associated with a retailer or manufacturer). A created route or sequence map is considered owned by the creator and may be private or shared to designated users or the general public. A route sequence map can be utilized as a road or navigation map allowing a user navigating elements or nodes of the route sequence map to reach certain resources available from the service center without requiring the user to specifically provide detailed information at runtime.

In one embodiment, a route sequence map includes various context elements or nodes which when toured appear arranged in a hierarchical structure. Each context element includes a property having one or more property values or attributes that can be used to specify one or more actions and/or one or more links to one or more other context elements (e.g., child context elements). A user or administrator can configure via a configuration interface of the service center to populate the property values of each context element. A context element can be one of an action context element and a navigation context element. An action context element can be configured such that when activated will cause the service center to perform an action using a method specified by one or more property values of the action context element. For example, an action context element can be configured to cause the service center to contact a particular person (e.g., friend or family member of a user, or a service support agent of the service center) using a particular communication method (e.g., voice, email, text such as short message system (SMS) or multimedia messaging service (MMS), video, chat, or a combination thereof). As a result, when a user activates this action context element from an application such as a mobile phone application, the service center can look up the property values of the corresponding action context element and to establish a communication session with a remote user associated with the action context element using a communication method specified by the action context element, without having the local user to provide the detailed information regarding how to reach the remote user at runtime.

A navigation context element can be configured that when activated, one or more related context elements can be identified that are related to the activated context element. During the configuration phase, a user can specify what other context elements (e.g., child context elements) are related to the current context element. The related context elements can include an action context element and/or another navigation context element that leads to one or more further context elements (e.g., grandchild context elements).

For example, a context element "Finance" can be configured to be associated with one or more child context elements, such as "Chase," "Bank of America," and "Wells Fargo," etc. In this way, a user can group or associate all of the financial institutes under the "Finance" context element and navigate each of the associated child context elements from there, without having to search and provide details how to each those entities. Alternatively, the "Finance" context element can be associated with a child action context element such as a "Call My Financial Advisor" context element that when activated will make a voice call to the specified finance advisor, which may be specified in one or more property values of the "Call My Financial Advisor" context element. As a result, the user does not have to provide detailed information of how to call its financial advisor at run time. It is also possible to combine user information gathered during a registration activity which is contained in or managed by the users profile or by the provider of the navigation map to be included in the information provided to the financial advisor for the benefit of provided more efficient service and fostering an environment of relatedness. The configured route sequence map can then be stored in a database of the service center, such as user database and/or client database. Such a route sequence map can be retrieved subsequently by the service center in response to a request or command received from an application running at a remote device over a network.

According to one embodiment, an application (also referred to as a navigation application) can be provided and installed at a device of a user, such as a mobile phone, laptop, desktop, or a Web-based application. When the application is launched from a client device such as a mobile phone, the application is to access the service center over a network for authenticating a user of the client device, for example, based on username and password of a user associated with the client device and/or a unique device identifier (ID) of the client device. Once the user has been successfully authenticated by the service center, the service center retrieves a route sequence map from a user database and/or client database that has been previously configured and stored and transmits information representing the route sequence map to the client device to be presented at a display of the client device. The provider of the route sequence map may elect, at their discretion, to provide route sequence maps for users who have not been authenticated and are considered anonymous clients.

According to one embodiment, a route sequence map is displayed in multiple rows of graphical representations, each graphical representation corresponding to a context element of the route sequence map. An inner or lower row of the route sequence map represents a parent row to a child row displayed as an outer or upper row of the route sequence map. When a graphical representation of an inner or lower row is selected (e.g., highlighted), an ID of the selected graphical representation is transmitted by the application of the client device to the service center over a network. Based on the ID, the service center is to identify a selected context element of the route sequence map. If the selected context element is an action context element, the service center is to perform an action that is specified in a property value of the selected context element using a method specified in a property value of the selected context element. If the selected context element is a navigation context element, the service center is to identify one or more child context elements associated with the selected context element and transmit the information of the child context elements to the client device. The client device is to display one or more graphical representations representing the one or more child context elements in an outer or upper row, while the selected graphical representation remains highlighted in the inner or lower row. As a result, the user can easily navigate context elements of the route sequence map via the application, without the hassles of managing the individual elements of the route sequence and their detailed settings. The selection and delivery of child context elements may be controlled in many ways including but not limited to user profile information, time of day, geographic location and a variety of defined business rules.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc. Note that throughout this application a mobile device is utilized as an example of a client device for the purposes of illustration only; other devices such as a desktop or server may also be applied herein.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, route sequence manager 107, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent in a skill, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application. Further detailed information concerning service center 102 and/or support service system 106 can be found in co-pending U.S. patent application Ser. No. 13/085,397, filed Apr. 12, 2011, which is incorporated by reference in its entirety.

In one embodiment, community service system 105 is responsible for communicating with social communities 116 via an API, for example, to post a message received from a user and to route the responses received from social communities 116 back to the user. Service center 102 further includes other components such as a post market service system (not shown), which is responsible for handling post market activities associated with the registered products, including selling a registered product on eCommerce sites 120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, a post market service system of service center 102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In one embodiment, a user can transmit a request from mobile device 101 to service center 102, where the request includes a message to be posted and one or more community identifiers identifying one or more registered social communities. In response, community service system 105 of service center 102 is configured to retrieve the associated credentials from the database and to post the message to the specified social communities together with the associated credentials allow the social communities to authenticate the user, without having to prompt the user for the same credentials. Further detailed information concerning community service system 105 and/or post market service system 107 can be found in co-pending U.S. patent application Ser. No. 13/185,213, filed Jul. 18, 2011, which is incorporated by reference herein in its entirety.

In one embodiment, service center 102 further includes a messaging or advertisement system (not shown) responsible for handling any messages received from a variety of partners or parties, such as client sites 117, client backend systems 118, manufacturer backend systems 119, and eCommerce sites 120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to deliver subsequent messages or advertisements on behalf of the message or advertisement providers accordingly. Further detailed information concerning the advertisement system can be found in co-pending U.S. patent application Ser. No. 13/185,309, filed Jul. 18, 2011, which is incorporated by reference herein in its entirety.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledgebase 113 is used to store knowledge collected and compiled over a period of time, which can be used by agents 115 and/or users for self-support purposes.

In one embodiment, service center 102 further includes a multi-channel communication and routing system 108 to provide one or more communication channels to any user or client to concurrently access service center 102. Examples of communication channels include email, chat, texting (e.g., SMS or MMS), voice (e.g., automated IVR, real-time, or VoIP), video, Web (e.g., Web conferencing), and/or online community forum (e.g., Facebook™ or Twitter™), or a combination thereof. Note that the multi-channel communication and routing system 108 may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multichannel communication system. A customer can obtain support services from service center 102 via a variety of communication mechanisms. A customer can initiate a support request to contact a live agent such as agents 115 in a live manner. Alternatively, a customer may browse certain knowledgebase, such as KB 113 via a Web interface, in an attempt to find a solution to a problem of a product he/she purchased from a manufacturer via a client of service center 102.

According to one embodiment, application 103 is installed on mobile device 101 of a customer or user, where application 103 can serve as a central service point or entry point to service center 102 that provides support services to a variety of products or services provided by a variety of vendors. The vendors can be, for example, manufacturers, distributors, retailers, service brokers, purchasing houses, etc. of the products. Vendors may be the clients of service center 102 or entities having a business relationship with service center 102. A user (also referred to herein as a customer) can activate application 103 from the user's mobile device 101 to reach agents 115 the service center 102 or KB data center 113 via a variety of communication channels or media, such as, for example, email, chat, voice (including automated interactive voice recognition or IVR, voice over Internet protocol or VoIP), video, Web, and/or online community-based forum, etc. Application 103 can be a thin/thick client application or a Web-based application.

According to one embodiment, service center 102 further includes guided support identification system 125 configured to analyze user interaction or behaviors to predict or determine a support subject matter that a user may potentially need. Such a support subject matter may be determined based on user interaction while a user is navigating a presentation provided by a remote device such as a Web site or an application running at computing device 101, where the presentation (e.g., application 103) includes information describing a possible solution to a problem of a product or service, which may be related to or similar to a product or service the user is interested in.

The user interaction may be captured (e.g., by a capturing logic integrated within or accessible by the presentation) at the remote device and transmitted to guided support identification system 125 over a network while the user is navigating the presentation at remote device 101. Based on the predicted subject matter (also referred to as a support type), a skill set (also referred to as a skill route) that is required to provide support services of the subject matter is identified. When the user subsequently requests a live support, for example, within the same user session, an agent having the identified skill set is selected to provide support services to the user. The user interaction may be periodically captured and transmitted to the service center during navigation of the presentation. In response, guided support identification system 125 is configured to automatically update and maintain the subject matter determined based on the latest user interaction prior to the user's request for a live support.

As a result, the guided support identification system is able to get users in need of assistance to a specific skill or expert specialist that is able to support their request or need, even before the user initiates a live support. Once the support subject matter and the required skill set have been identified, a route context (e.g., touch plan) can be generated by support service system 106 as described in the above incorporated-by-reference applications, where the routing context includes all the necessary information an agent needs in order to provide the best support services to the user. Such an agent is referred to herein as a recommended agent recommended by the service center. A communications session is then established by multi-channel communications and routing system 108 and the routing context is routed to the selected agent. Further detailed information concerning guided support identification system 125 can be found in co-pending U.S. patent application Ser. No. 13/213, 002, filed Aug. 18, 2011, which is incorporated by reference herein in its entirety.

According to one embodiment, guided support identification system 125 is configured to maintain which agents a particular user has interacted with during previous support sessions and to store such information in a user database associated with the user. Such information may include user ratings of the agent by the user or other users, subject matters of the previous support sessions, or others. Some of these agents (e.g., those rated relatively high by the user) may be considered as preferred agents by the user dependent upon their respective ratings and/or other factors. When a user initiates a subsequent support session such as a live support session, information concerning one or more recommended agents provided by guided support identification system 125 and/or one or more preferred agents retrieved from the user database are transmitted from service center 102 to remote device 101 to be presented to the user. The user can select one of the recommended agents and preferred agents to establish a live support session. Alternatively, the user can simply not select any of the preferred agents or recommended agents and instead let the system randomly assign an agent to the user.

In one embodiment, guided support identification system 125 includes a survey module (not shown) to provide a survey to a user at the conclusion of a support session to allow the user to provide a feedback or rating concerning a quality of the agent. The feedback or rating information is also stored (e.g., as a new preferred agent) or updated (e.g., updating ratings of an existing preferred agent) in a user database associated with the user, as well as general agent databases shared amongst other users. Such feedback or ratings from the user may affect subsequent selections of the subsequent preferred agents and/or recommended agents by guided support identification system 125. As a result, when a user initiates a live support session, the user can actively select an agent he/she prefers or is familiar with, which may improve customer satisfaction experience or measures.

According to one embodiment, route sequence manager 107 is configured to manage route sequence maps for a variety of users and/or a variety of clients. Route sequence manager 107 is to allow a user or an administrator to configure a route sequence map to help guiding a user to navigate resources available from a service center, such as, obtaining support services from a support service agent concerning a product or service provided by a client of the service center. A route sequence map is a collection of route sequences pulled together allowing a variety of operations to be performed via a service center and initiated from a single application such as application 103 of client device 101. A route sequence map can logically represent a global route context of a user that can lead to a variety of actions performed and/or one or more further route sequences of one or more related subject matters. Once a route sequence map has been configured via route sequence manager 107 and stored in one of the databases 110-113, a user can initiate from application 103 from device 101 to navigate the preconfigured resources associated with the route sequence map available from service center 102, without having to provide detailed information regarding how to access those resources at runtime.

According to one embodiment, route sequence manager 107 of service center 102 provides a configuration interface, such as an application programming interface (API) or a Web-based interface (e.g., Web portal) via a variety of communication protocols, which may be implemented as part of API 104, to allow an end user or an administrator of a corporate client to configure and/or create a route sequence map for the end user or users associated with the corporate client (e.g., employees of a corporation and/or buyers of products associated with a retailer or manufacturer). A route sequence map can be utilized as a road or navigation map allowing a user navigating elements or nodes of the route sequence map to reach certain resources available from service center 102 without requiring the user to specifically provide detailed information at runtime.

Figure 3A:
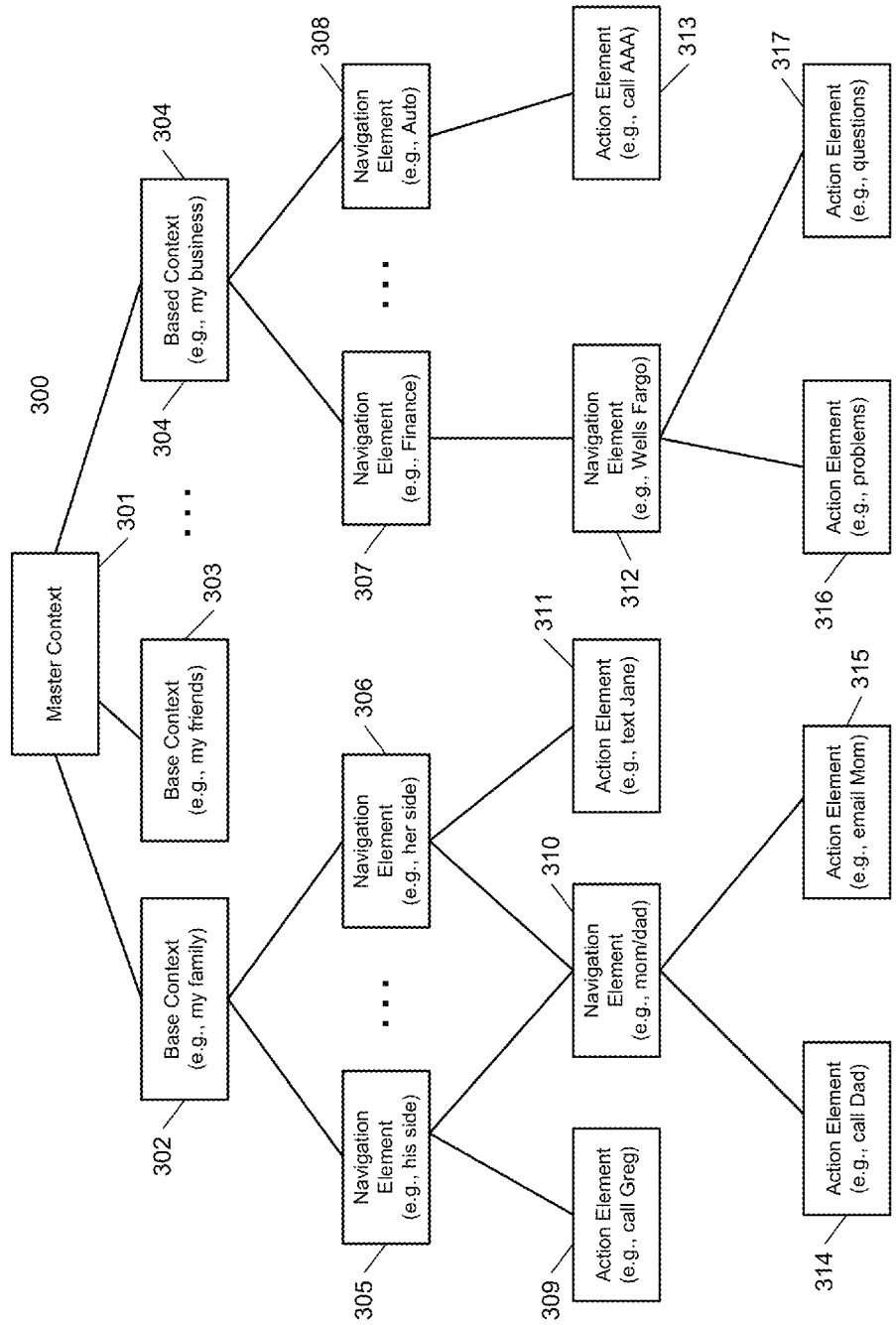
FIG. 3A is a block diagram illustrating a route sequence map according to one embodiment of the invention.

In one embodiment, a route sequence map includes various context elements or nodes arranged in a hierarchical structure as shown in FIG. 3A. Each context element includes a property having one or more property values or attributes that can be used to specify one or more actions and/or one or more links to one or more other context elements (e.g., child context elements). A user or administrator can configure via a configuration interface of the service center to populate the property values of each context element. A context element can be one of an action context element and a navigation context element. An action context element can be configured such that when activated will cause the service center to perform an action using a method specified by one or more property values of the action context element. For example, an action context element can be configured to cause the service center to contact a particular person (e.g., friend or family member of a user, or a service support agent of the service center) using a particular communication method (e.g., voice, email, text, video, chat). As a result, when a user activates this action context element from an application such as a mobile phone application, service center 102 can look up the property values of the corresponding action context element and to establish a communication session with a remote user associated with the action context element using a communication method specified by the action context element, without having the local user to provide the detailed information regarding how to reach the remote user at runtime.

A navigation context element can be configured, based on a variety of factors set forth above, that when activated, one or more related context elements can be identified that are related to the activated context element. During the configuration phase, a user can specify what other context elements (e.g., child context elements) are related to the current context element. The related context elements can include an action context element and/or another navigation context element that leads to one or more further context elements (e.g., grandchild context elements). For example, a context element "Finance" can be configured to be associated with one or more child context elements, such as "Chase," "Bank of America," and "Wells Fargo," etc. In this way, a user can group or associate all of the financial institutes under the "Finance" context element and navigate each of the associated child context elements from there, without having to search and provide details for each of those entities. Alternatively, the "Finance" context element can be associated with a child action context element such as a "Call My Financial Advisor" context element that when activated will make a voice call to the specified finance advisor, which may be specified in one or more property values of the "Call My Financial Advisor" context element. As a result, the user does not have to provide detailed information on how to call its financial advisor at run time. The configured route sequence map can then be stored in a database of the service center, such as a user database and/or client database. Such a route sequence map can be retrieved subsequently by route sequence manager 107 of service center 102 in response to a request or command received from application 103 running at remote device 101 over a network.

According to one embodiment, application (also referred to as a navigation application) 103 can be provided and installed at a device of a user, such as a mobile phone, laptop, desktop, or a Web-based application. When application 103 is launched from client device 101, application 103 is to access service center 102 over a network (e.g., Internet) for authenticating a user of the client device, for example, based on username and password of a user associated with client device 101 and/or a unique device identifier (ID) of client device 101. Once the user has been successfully authenticated by service center 102, route sequence manager 107 of service center 102 retrieves a route sequence map from a user database and/or client database that has been previously configured and stored and transmits information representing the route sequence map to the client device to be presented at a display of client device 101 by application 103.

According to one embodiment, a route sequence map is displayed in multiple rows of graphical representations, each graphical representation corresponding to a context element of the route sequence map. An inner or lower row of the route sequence map represents a parent row to a child row displayed as an outer or upper row of the route sequence map. When a graphical representation of an inner or lower row is selected (e.g., highlighted), an ID of the selected graphical representation is transmitted by application 103 of client device 101 to service center 102 over a network, which may be a local area network (LAN), a wide area network (e.g., Internet), or a combination thereof. Based on the ID, service center 102 is to identify a selected context element of the route sequence map. If the selected context element is an action context element, service center 102 is to perform an action that is specified in a property value of the selected context element using a method specified in a property value of the selected context element. If the selected context element is a navigation context element, route sequence manager 107 of service center 102 is to identify one or more child context elements associated with the selected context element and transmit the information of the child context elements to the client device. The client device 101 is to display one or more graphical representations representing the one or more child context elements in an outer or upper row, while the selected graphical representation remains highlighted in the inner or lower row. As a result, the user can easily navigate context elements of the route sequence map via the application, without the hassles of managing the individual elements of the route sequence and their detailed settings.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via the services APIs of the service center, without a need of a real person involved. Such processing logic and/or functional blocks can be implemented in software, hardware, or a combination thereof.

Figure 2:
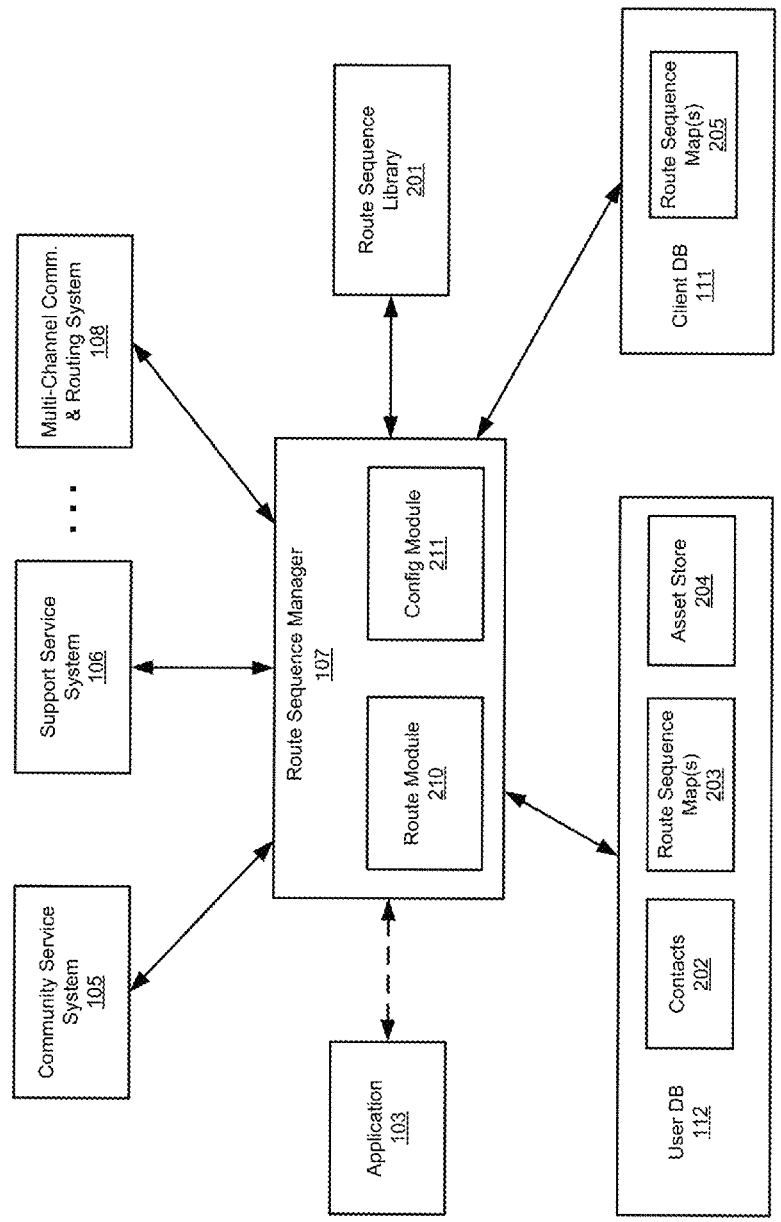
FIG. 2 is a block diagram illustrating an example of a service center according to another embodiment of the invention.

FIG. 2 is a block diagram illustrating a service center according to another embodiment of the invention. System 200 may be implemented as a part of system 100 of FIG. 1. Referring to FIG. 2, route sequence manager 107 includes route module 210 and configuration module 211. Configuration module 211 is configured to interact with an application 103 of a remote device via a configuration interface (e.g., Web interface) to create and configure a new route sequence map or to modify or update an existing route sequence associated with a user of the remote device. An end user or an administrator of a corporate client can communicate with configuration module 211 to create a route sequence map from scratch or alternatively using some basic building blocks representing certain basic context elements previously built or compiled and stored in route sequence library 201. A route sequence associated with a user may then be stored in user database 112 as part of route sequence map(s) 203. A route sequence map associated with a corporate client may be stored in client database 111 as part of route sequence map(s) 205.

Note that an individual user route sequence map may include a context element that links to another route sequence map such as a corporate client route sequence map, or vice versa. For example, an individual user may have some base navigation context elements such as "My Family," "My Friends," and "My Business," where the "My Business" context element may link to a specific bank such as "Wells Fargo" context element, which further links to a route sequence map associated with the Wells Fargo bank as a corporate client, where the context element associated with the corporate client may be configured by an administrator of the corporate client, for example, for specifically obtaining support services associated with the corporate client. User database 112 associated with a user may store a variety of information or data associated with the user, such as, for example, personal contacts 202, asset store 204 (e.g., registered products), and user preferences (e.g., preferred agents, preferred communication channels, credentials to access other sites such as online communities).

A route sequence map can logically represent a global route context of a user that can lead to a variety of actions performed and/or one or more further route sequences of one or more related subject matters. Once a route sequence map has been configured, a user can initiate from an application from a variety of platforms (e.g., mobile phone, laptop, tablet, and desktop) to navigate the preconfigured resources associated with the route sequence map available from the service center, without having to provide detailed information regarding how to access those resources at runtime. As a result, the user experience with the service center can be greatly enhanced.

According to one embodiment, the service center provides a configuration interface, such as an application programming interface (API), a Web-based interface (e.g., Web portal), or a previously installed client or hosted application, via a variety of communication protocols, to allow an end user or an administrator of a corporate client to configure and/or create a route sequence map for the end user or users associated with the corporate client (e.g., employees of a corporation and/or buyers of products associated with a retailer or manufacturer). A route sequence map can be utilized as a road or navigation map allowing a user navigating elements or nodes of the route sequence map to reach certain resources available from the service center without requiring the user to specifically provide detailed information at runtime.

In one embodiment, a route sequence map includes various context elements or nodes arranged in a hierarchical structure. Each context element includes a property having one or more property values or attributes that can be used to specify one or more actions and/or one or more links to one or more other context elements (e.g., child context elements). A user or administrator can configure via configuration module 211 of route sequence manager 107 to populate the property values of each context element.

Figure 5B:
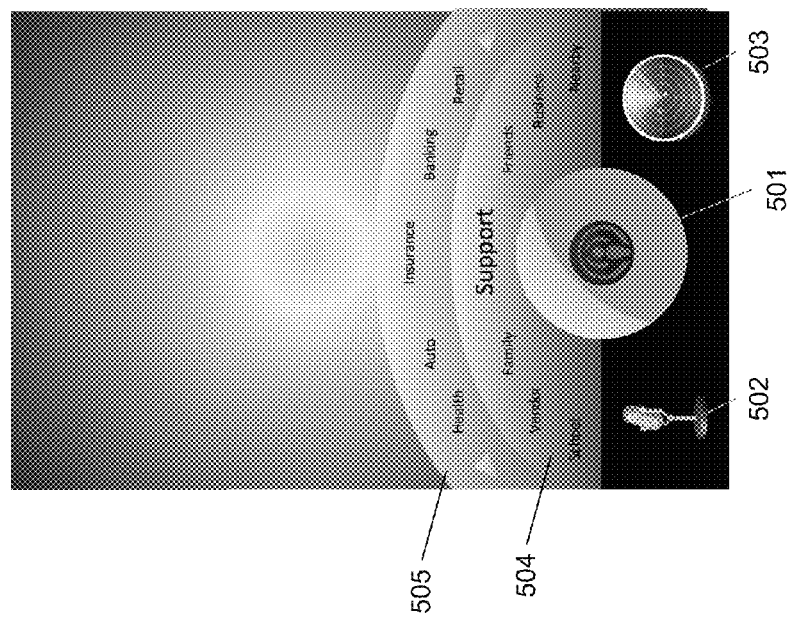
FIGS. 5A-5E are screenshots illustrating a graphical user interface of a navigation application according to one embodiment of the invention.
Figure 5A:
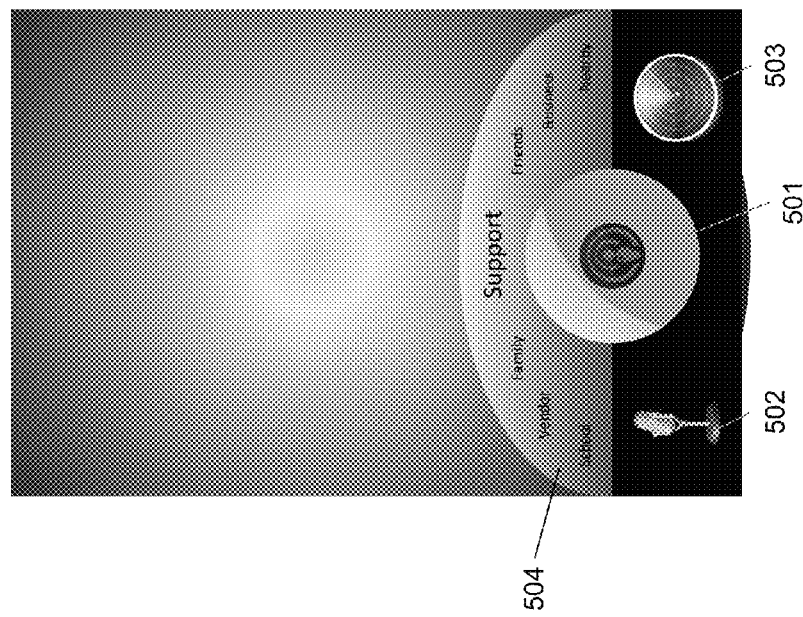
Figure 5D:
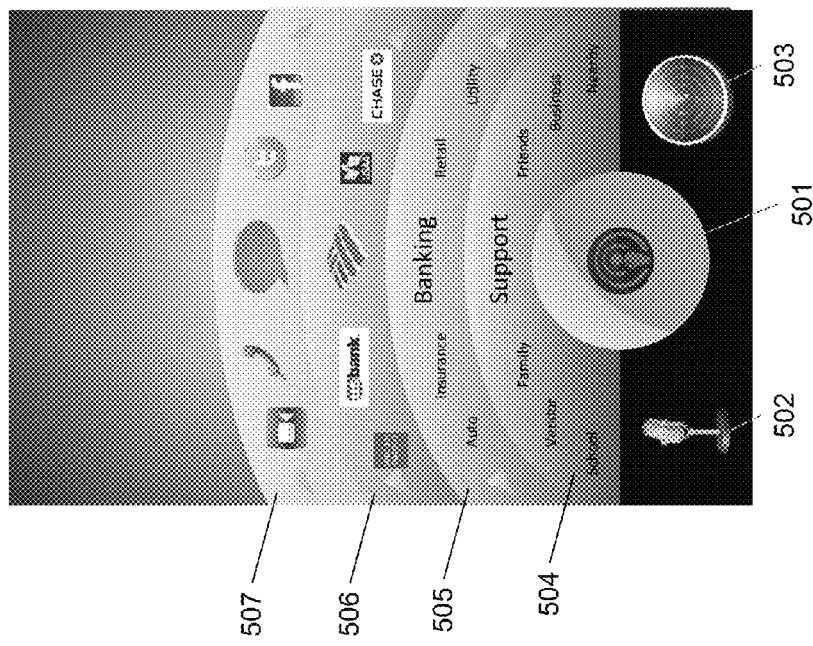

FIG. 3A is a block diagram illustrating an example of a route sequence map according to one embodiment of the invention. Route sequence map 300 may be created via route configuration module 211 of FIG. 2 and can be used to navigate via route module 210 of FIG. 2 resources available from service center 200 such as community service system 105, support service system 106, and multi-channel communication and routing system 108, etc. Referring to FIG. 3A, in this example, route sequence map 300 includes master context 301 linking various base contexts 302-304, where master context 301 serves as a place holder and provides some basic or default settings or options (e.g., default communication methods). Route sequence map 300 includes context elements 302-317 arranged in a hierarchical or tree structure. A context element may have one or more child context elements and it itself may be a child context element to a parent context element. For example, context element 305 may be a parent context element to child context elements 309-310, while context element 305 is a child context element to parent context element 302. Each context element can be configured by setting certain property values or attributes in its property. While the sequence map appears to have a defined hierarchy to the navigation and actions defined, an action can be performed to call a separate sequence map such as context element 312 of FIG. 3A, which may provides an entry point to another or separate sequence route map. This could be a full sequence map of its own, in this example, for Wells Fargo to be called from this sequence map example branching off into a different sequence route map all together when selected. From the Navigator Application, in this example, the Wells Fargo Sequence can be displayed when selected as it appears in FIGS. 5C and 5D or reset to display from the root Navigator app level as shown in FIG. 5E. Sequence maps may be shared by their owner(s) and may be included by owner(s) of other sequence maps providing additional options for the user. The incorporated sequence map is only referenced and if changes or modifications are made to the referenced sequence map they will immediately be in effect and experienced by the user who selects to tour than sequence map. The owner of the sequence map who has included the referenced sequence map has no or reduced ownership or modification rights to the referenced sequence map.

Figure 3B:
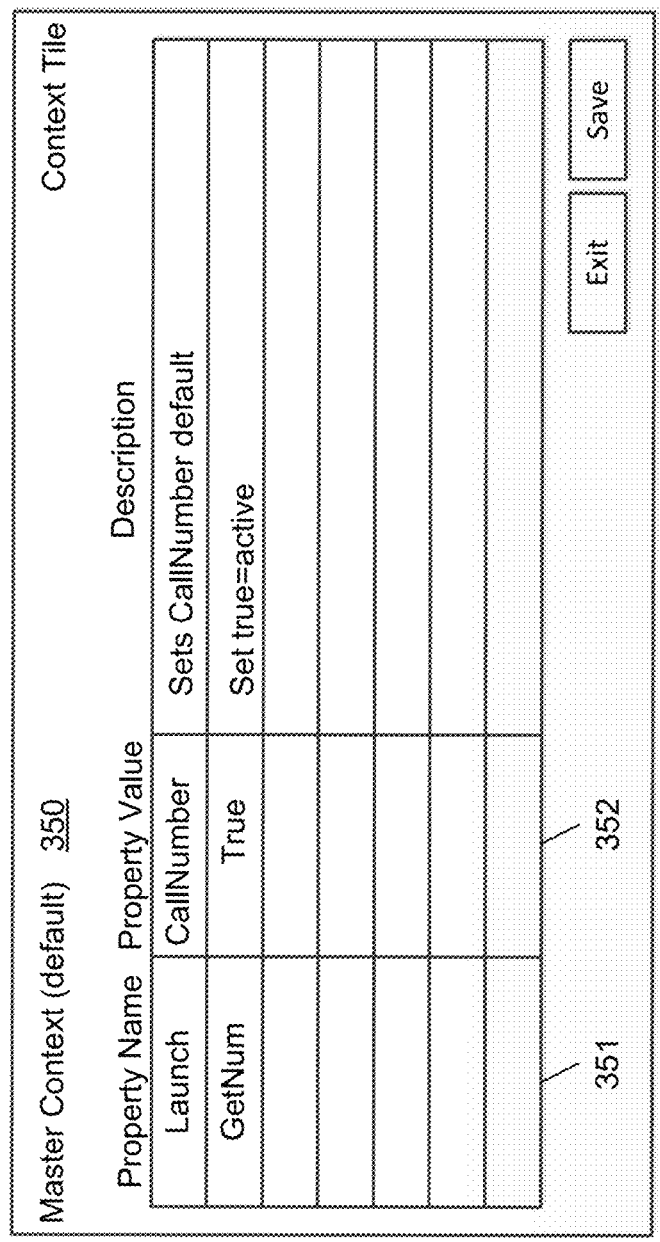
FIG. 3B shows an example of a master context according to one embodiment of the invention.

FIG. 3B is a block diagram illustrating a user interface to configure property values of a master context according to one embodiment of the invention. Referring to FIG. 3B, master context 350 includes one or more properties 351 and their corresponding property values 352. In this example, there is one action property "GetNum" (e.g., retrieve a phone number and call the retrieved phone number) and its property value is set to TRUE, as a default setting. Any child context element that is based on the master context can inherit or override the corresponding properties.

In one embodiment, a context element can be configured as one of an action context element and a navigation context element. An action context element can be configured such that when activated will cause the service center to perform an action using a method specified by one or more property values of the action context element. For example, context element 309 is an action context element can be configured to cause the service center to contact a particular person (e.g., friend or family member of a user, or a service support agent of the service center), using a particular communication method (e.g., voice, email, text, video, chat). In this example, context element 309 has been configured (via its property), when activated, causing the service center to establish a voice communication session with another user "Greg" using a phone number that has also been specified in a property value of context element 309. As a result, when a user activates this action context element from an application such as a mobile phone application, the service center can look up the property values of the corresponding action context element and to establish a communication session with a remote user associated with the action context element using a communication method specified by the action context element, without having the local user to provide the detailed information (in this example, specifying a voice call and/or a phone number for the voice call) regarding how to reach the remote user at runtime.

A navigation context element can be configured that when activated, one or more related context elements can be identified that are related to the activated context element. During the configuration phase, a user can specify what other context elements (e.g., child context elements 309-310) are related to the current context element (e.g., context element 305). The related context elements can include an action context element (e.g., context element 309) and/or another navigation context element (e.g., context element 310) that leads to one or more further context elements (e.g., grandchild context elements 314-315). The configured route sequence map 300 can then be stored in a database of the service center, such as user database and/or client database. Such a route sequence map can be retrieved subsequently by the service center in response to a request or command received from an application running at a remote device over a network.

Note that each of the context elements can be stored in a variety of data structures and linked to each other (e.g., using a linked list data structure). In one embodiment, master context 301 provides default settings for its child context elements 302-317. Each of the child context elements 302-317 can inherit or override the default settings by specifically specifying the same property value in its property. Alternatively, certain property values can be left blank or unspecified in which case the system may automatically determine the proper values at the point in time. For example, a user may leave the phone number in the property of context element 309 blank during the configuration stage. Subsequently, when a user activates from its application running at a remote client device, an instruction is sent to the service center. In response, the service center automatically determines a proper phone number associated with the user "Greg" of context element 309 to establish a voice call. In this example, user "Greg" may have multiple phone numbers (e.g., work, home, and mobile phone numbers) to be utilized in different situations. The service center may determine at the point in time, for example, based on presence information obtained via presence services, that the voice call should be made to Greg's mobile phone number, provided, Greg has published its presence information. In this way, the local user does not need to know what phone number of Greg should be use to make the voice call. Further, user Greg may dynamically change his phone number from time to time. By leaving the phone number blank in context element 309, the system can dynamically determine the correct phone number for Greg without having to statically specify it in the property of context element 309. Similarly, the same techniques can be applied to other communication methods such as chat, text, and video, etc.

According to one embodiment, an application running at a client device can be a navigation application to navigate context elements 302-317 of route sequence map 300, a configuration application to configure context elements 302-317 of route sequence map 300, or a combination of both. When an application is launched from a client device as a navigation application (e.g., application 103), the application connects to service center 102 via published API's accessible over the Internet for authentication. Once the user of the application has been successfully authenticated, the route sequence manager of the service center transmit data representing route sequence map 300 via published APIs to the client device to be displayed at a display of the client device by the application. Route sequence map 300 may be displayed as rows of graphical representations (e.g., icons or thumbnail images), each graphical representation representing a context element or in another presentation form the client has created. An inner or lower row represents a parent level of context elements, while an outer or upper row represents a child level of context elements.

Initially, according to one embodiment, data representing only the root level of context elements, in this example, context elements 302-304, is transmitted to the remote device via published APIs and the graphical representations are displayed as the most inner or lowest row. When a user selects one of the graphical representations, an ID of the selected graphical representation is sent back to the service center. The route sequence manager determines whether the selected context element is an action context element or a navigation context element. If the selected context element is a navigation context element, the route sequence manager identifies based on the ID of the graphical representation a context element associated with the ID and identifies one or more child context elements of the selected context element. Data representing the child context elements is then transmitted via published APIs to the remote device and an outer or upper row of graphical representations corresponding to the child context elements are then displayed at the remote device. For example, if a user selects a graphical representation corresponding to context element 305, data representing child context elements 309-310 is then transmitted via published APIs from the service center to the remote device and graphical representations corresponding to context elements 309-310 are then displayed as an outer or upper row at the remote device. The graphical representations of an outer or upper row can be scrolled, rotated, or spun around an inner or lower row, while the selected context element is highlighted in the inner or lower row. If the selected context element is an action context element, the route sequence manager invokes an appropriate component or system of the service center to perform an action defined in a property of the selected context element.

According to one embodiment, an application such as application 103 (also referred to herein as "Navigator App") is a mobile and/or Web-based application providing a user an entry point into the vast world of support, services, contacts and the organization and management of that information. A user uses the Navigator App to guide them via a few simple clicks down a short context based path to a support, service or other type of routing activity. A user once guided through a short sequence, presses a "One-Touch" button to execute the activity (a routing sequence) for any support or service required on behalf of a business or other party. Once the sequence is executed, the user is taken into a variety of support and service models, most pre-defined by the companies they have requested contact with.

The Navigator App eases the user into a rich context based support or service session with a company instead of the basic and typical methods employed today. The Navigator App can direct dial or toll free calling from a traditional PSTN (public switched telephone network) or mobile device to a support queue without any context of the support or service need. A company utilizing this model typically collects information from a user just to ask for the same information once the user gets to a support person or somewhere else in the support process. The Navigator App can support click to call from a web page into a support queue without any context of the support or service need, click to chat from a web page into a support queue without any context of the support or service need, email from a web site requesting support or services, where the email subject is typically all that is utilized to determine context of the request, and SMS from a mobile device into a support queue without any context of the support or service need. This is very limited in use due to the lack of support by most support systems.

A Navigator App can be a Personal Navigator App that will allow a user to create, modify and delete items ("customize") from their "instance" of navigator data and metadata from their mobile device. Within this customization is the ability to change the appearance ("skins") and tie into their personal and social communities. They can publish selected data so that others using a navigator can link to their information via a sharing model. A Navigator App can also be a Business Navigator App that is predesigned by a business entity (company) and is displayed as such in a custom ("branded") version of the App that a user would use for support and services with a business. A company could integrate this custom Navigator App into their own for ease of support for the user. Business can also publish their navigator data for inclusion in Business and Personal navigators.

All Routing Sequence changes can be made from the Service Center by the Business (company) and does not require a new version of the Navigator App on a mobile device or via a web page thus making the Navigator a dynamic application subject to real-time routing sequence changes and refinement. Navigator definition data may be defined so that it is populated from external data sources in a real time model or periodic update model. Once a communication session has been established by the user, the user is transitioned to the conversation "Canvas" and a dialog between the user and the Support Center is established.

Web Routing Sequences are predefined Routing Sequences (context based) that can be called from anywhere within a business/personal web site where a Navigator App is not required. The Web Sequence called is made up of a variety of (but not limited to) specifics about a particular product, service, other item a customer would be selecting from the web site. Once a Routing Sequence is executed from a "One Touch" button, the web site can provide additional information collected to further refine (if necessary) the proper routing of the user request. The predefined piece of information sets the context of a "one touch" button and when selected, is transmitted to the service center to set the specific action and context for a user's support request, which can be carried out via variety of programming languages such as extensible markup language (XML) as shown in FIG. 10A or other script language such as hypertext markup language (HTML) as shown in FIG. 10B.

A Personal Navigator App is for a user to utilize as a multi-purpose app allowing the user to not only access specific context based support and services added as needed, but to also access all their contacts from their mobile device in which the app is loaded. It is possible for the user to transfer their contacts into navigator information which is managed in the cloud by servers providing navigator services. This information will be secured and protected. Contact information can be enriched to use features offered by the navigator application. Enrichments include items such as external system access, asset and service information, social communities, social communication and presence acquisition abilities.

The user can setup the app to either access or restrict access to their personal information and contact information including social communities as preferred. If access is granted, the user can then utilize a single app for all communications of various channel types to their communities and contacts from the "My Contacts" or "My Communities" selections. A user would be presented a list of the contacts found, and allow access to the navigator for any and all contacts. If a user wishes, contacts can be further separated via "My Friends", "My Family" or other selections to reduce the list of contacts to select from. A new selection can be added to the Navigator via the Navigator configuration menu. A search function is always available as an option. The "labels" for each can be changed to allow a user to further customize. The user can add specific pre-created business routing sequences to their Navigator App organized via the "My Business" selection, each of these Routing Sequence Maps (made available to users) will be listed, allowing the user to select the one(s) they require. Once the selected Routing Sequences are committed the dialer will update the view showing all the new selections requested.

A Business Navigator App is for custom skinned and prepped versions. This allows a company to either provide a custom version of the Navigator App to their customers which is skinned and Routing Sequences defined (they may not have a mobile presence), or to integrate the Navigator into their current mobile app to leverage and access Routing Sequences. The Routing Sequences demonstrated in the Personal Navigator App can be leveraged in the company version without recreation. Routing Sequences created for the Navigator App can also be used as a Web Routing Sequence via a company Web site.

A Navigator App can leverage the power of the service center and its vast support and service capabilities to execute a routing sequence. The Navigator App leverages any and all communication channels as prescribed by a business in support of their customers. Routing channels supported via the Support Center include Voice inbound and outbound via; a) PSTN, VoIP, b) Skype, Gtalk and Facetime Intelligent Communication networks, other Intelligent Communications networks can be supported (future). There is no need to dial a number for anything. The Navigator App knows how to contact and connect the user to the Service Center for any support or service via any communication channel. The Navigator App takes the place of the traditional DTMF dialer of a traditional or mobile phone.

The routing channels further include video inbound and outbound via Skype, Gtalk and Facetime Intelligent Communication networks, other Intelligent Communications networks can be supported (future). The routing channels further include email inbound and outbound. Email is recommended as an outbound notification only channel from the Service Center as a result of a customer activity. The Navigator App is positioned as a self-help and real-time communication method for users. Email still can be supported by the Service Center directly. The routing channels further include chat inbound and outbound. Chat is a recommended communication channel for real-time communication with a customer and is a lower cost alternative to voice or video communications. A Web Routing Sequence is used to set the context of the support or service need when coming from a Navigator App or company web site.

The routing channels further include SMS inbound and outbound. SMS is recommended as an outbound notification channel from the Service Center but is being adopted by mobile users as a Chat type of communications for inbound service and support. SMS and Chat support function in the same manner when delivered to a support associate via the Support Center. The routing channels further include social inbound and outbound. Social is a must have channel for all modern businesses today. Social posts from such communities as Twitter and Facebook can be leveraged for inbound and outbound support and service communications. These are most often supported directly from the communities to the Support Center and not via the Navigator App. Future implementations will allow access to such communities without having to leave the Navigator App. Other information sources such as vehicle status telemetry, home monitoring/alarm applications and other signal emitting services can be used to update navigator information and the presentation of that information to the benefit of the user.

According to some embodiments, a dynamic routing sequence is a series of selections made by a user leading to a specific action to be taken on their behalf via the Service Center. The action once selected communicates with the Support Center via published APIs to invoke the request. Routing Sequences never are stored on the mobile device or web client. The Service Center is leveraged in all cases in order to maintain the latest, up to date copy of one or a combination of Routing Sequences, allowing a single Routing Sequence to be leveraged for millions of users, to make changes to a single Routing Sequence in a single place for immediate availability in the next use, to back up and make available any user generated data in the event that their mobile device fails and the Navigator App is loaded onto a new device. By authenticating themselves via the Navigator App on their new device they will resume access to all data.

The Navigator App calls a set of public API's built custom to support the capabilities of the Navigator App. The information transmitted to the Service Center includes (but not limited to) context based on the specific sequence selected from the Navigator App, specific information about the user when prompted for additional information such as a question that they may ask via the knowledge answer engine of the Service Center, and specific user identity (if known) via a user authentication with the Service Center.

A personal-based route sequence map is a collection of Routing Sequences added to the users' authenticated account and saved by the Service Center. They are added to the users account by the user as needed to reach out to a company for support and services. A business-based sequence map is a collection of routing sequences added to a custom company Navigator App that provides some or all of the same access of support and services for the user as the Routing Sequence they would add to their Personal Navigator App. Sequence Maps are multi-entrant meaning that any sub-sequence of a map can be executed without having to travel the same path. Entry points to maps may be shared and become discoverable via web pages, directory services, search engines or point to point sharing with others using the navigator application.

According to one embodiment, a master context provides context about the sequence(s) (or map) in an application. The context is set as a default and is inherited if not overridden by a sequence when a user selects thus base lining the overall context of a user's request when passed to a live associate or an automated system/workflow. In one embodiment, a master context can be configured as follows:

| Property Name | Property Value(s) |
|---|---|
| ChannelType | voice |
| VoiceSkill | Horizon Voice |
| ChannelType | video |
| VideoSkill | Horizon Video |
| ChannelType | chat |
| ChatSkill | Horizon Chat |
| ChannelType | social |
| SocialSkill | Horizon Social |
| ChannelType | text |
| TextSkill | Horizon Text |
| ChannelType | email |
| EmailSkill | Horizon Email |
| ChannelType | answer |
| Button | Chat (uses the channel from the Master Context if not overridden in a child tile) |
| Button | voice (uses the channel from the Master Context if not overridden in a child tile) |
| Question | How do I become a Wells Fargo customer? |
| Launch | ExternalLink |
| List | true |
| Launch | ExternalLink |
| LinkName | Wells_Fargo |
| LinkRoot | false |
| Launch | ExternalService |
| Transport | https |
| Address | www.wf.com |
| Launch | login |
| Launch | registration |
| Launch | profile |

A navigation context element is used to guide a user to the next context element selected by a user. An action context element is used to invoke one of many types of actions, including, for example:

Voice interaction—
    Set "ChannelType"="voice"
    Set "VoiceSkill"="Horizon Voice" (e.g., a skill for project Horizon)
Video interaction—
    Set "ChannelType"="video"
    Set "VideoSkill"="Horizon video" (e.g., a skill for project Horizon)
Chat interaction—
    Set "ChannelType"="chat"
    Set "ChatSkill"="Horizon chat" (e.g., a skill for project Horizon)
Social interaction—
    Set "ChannelType"="social"
    Set "SocialSkill"="Horizon social" (e.g., a skill for project Horizon)
Text interaction—
    Set "ChannelType"="text"
    Set "TextSkill"="Horizon text" (e.g., a skill for project Horizon, like chat)
Email interaction—
    Set "ChannelType"="email"
    Set "EmailSkill"="Horizon email" (e.g., a skill for project Horizon)
Answer Engine—allows the user to enter the automated answer engine to ask specific questions, a default can be setup to be displayed when a user enters, other recommended or free-form questions can be entered/selected
    Set "ChannelType"="Answer"
    If there is the possibility for accessing another communication channel, the skill associated with the internal "channel type" will be used to support that conversation.

Set "question"="How do I become a Wells Fargo customer?" (set a default question to be asked, can be left blank for free form initial question)

Call Number—gets a number from the user current mobile devices contact list to call
   Set "Launch"="CallNumber"
   Set "GetNum"="true", setting to "false" restricts the app from accessing the user mobile contact list Add ExternalLink—adds a predefined sequence action tile from a list of published sequences, to the display of the current Navigator App (as permitted) to be executed
   Set "Launch"="ExternalLink"
   Set "list"="true" if set to false, no list will be displayed Call Sequence—allows the added sequence to a Navigator App to be called directly
   Set "Launch"="ExternalLink"
   Set "LinkName"="wells_$_{fargo}$"
   Set "LinkRoot"="true" allows the previous sequence map displayed to be replaced with the requested sequence/map, if set "false" then the sequence is shown in the same display as the next level in the Navigator user interface External Resource—allows calling an external resource like a URL for a survey, etc.
   Set "Launch"=ExternalService
   Set "transport"=https (secure and non-secure supported)
   Set "address"=www.wf.com Login—allows requesting a login to the app for access to another part of a service or support—executes a login script
   Set "Launch"=login Registration—allows requesting a user registration to the app for access to another part of a service or support—executes a registration script
   Set "Launch"=registration Profile—allows requesting a user profile in the app for access to another part of a service or support—executes a profile script
   Set "Launch"=profile According to some embodiments, the Support Center warehouses a number of Routing Sequence Maps and Routing Sequences for inclusion within a company's productions setup. All Routing Sequences are multi-tenant with contextual information collected, stored and secure from all other companies on the Support Center. All the Routing Sequences are maintained in the Support Center and accessible via public API's. With this SaaS (software as a service) model it makes it easy to leverage for any Mobile or Web Navigator App as well as other such apps to leverage. Presentation of the routing sequences within an application, mobile or web, can take on many different looks and feels depending on the intended audience. The examples provided illustrate some concepts on how to display the information necessary for the user to make choices based on fixed and real time information. Fixed information may be the presentation of a name or directive. Real time information may be whether the intended endpoint is available or on line; presence information. Routing sequences can be created dynamically or via configuration tools provided with the product. These sequences are based on published XML Schemas which can be defined by the clients or by the application developers so that complete data for the execution of a sequence is ensured. Routing sequences can be defined to ask the user for further information via controls rendered within a web page as dialogues, selections or text input controls.

Figure 4A:
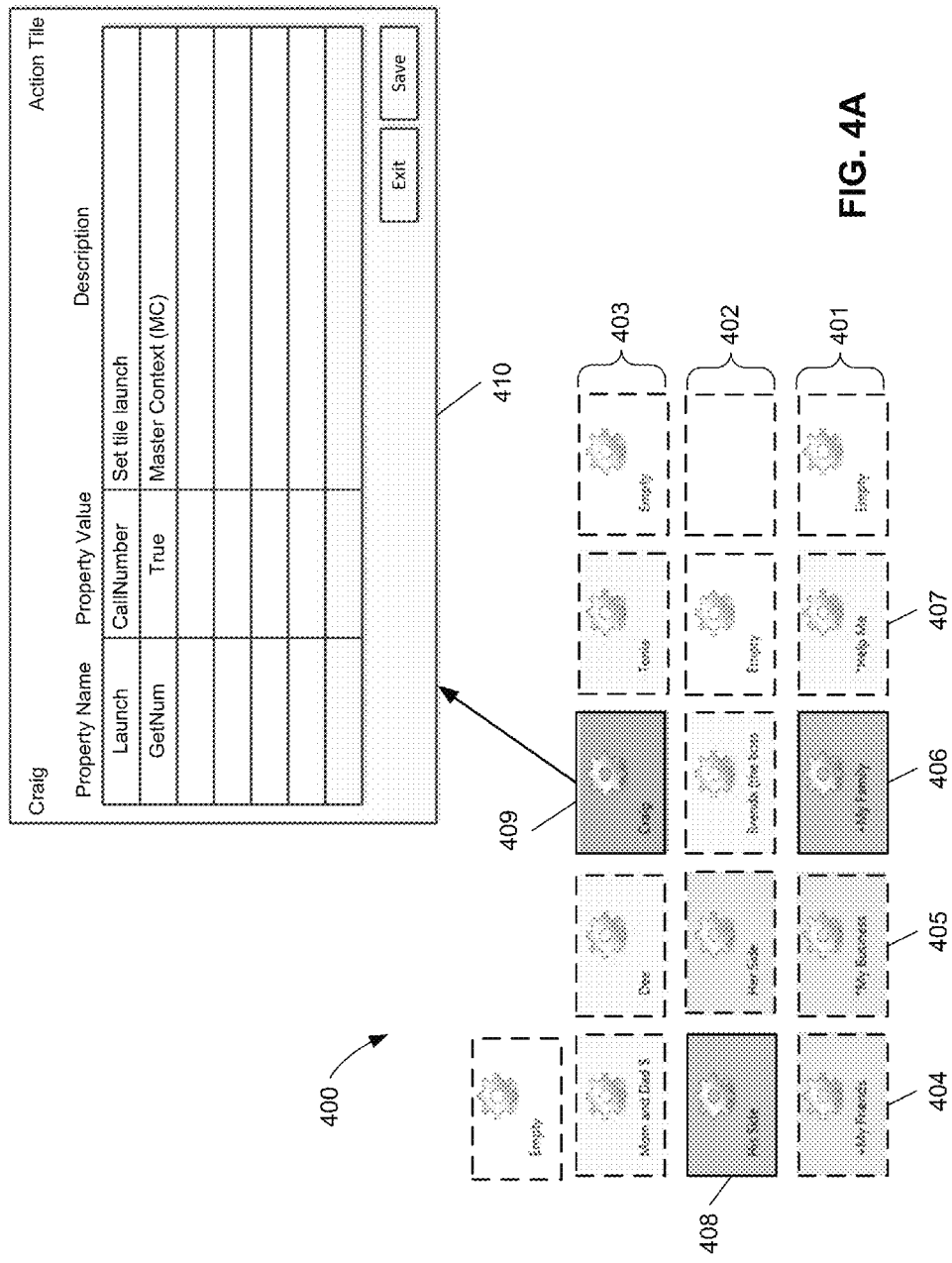

FIGS. 4A-4E are screenshots illustrating a process for configuring context elements of a route sequence map according to one embodiment of the invention. Referring to FIG. 4A, context elements are represented by context tiles, although other graphical representations such as icons or thumbnails may also be utilized. In this example, route sequence map 400 includes multiple rows 401-403 of context tiles, each context tile representing a context element. From this user interface, a user can create a new context element and/or modify an existing context element by populating attributes or property values in its corresponding property. Initially, context tiles of bottom row 401 may be created or inserted, which may include at least one navigation context tile and/or at least one action context tile. In this example, row 401 includes context tiles 404-407 corresponding to different categories (e.g., "My Friends," "My Business," and "My Family").

From any of the context tile (e.g., navigation tiles), according to one embodiment, the user can create further child context tiles by selecting any of the context tiles 404-407. In this example, context tile 406 is selected, which is illustrated by a solid box (while an unselected context tile is shown in a dash box). Once context tile 406 is selected, at least one context tile is shown in an upper row, in this example, row 402. The user can then edit the property of each of the context tiles in row 402. Similarly, when a context tile of row 402 is selected, in this example, context tile 408, row 403 is displayed and the use can further edit the property of each context tile such as property 410 for context tile 409.

Figure 4B:
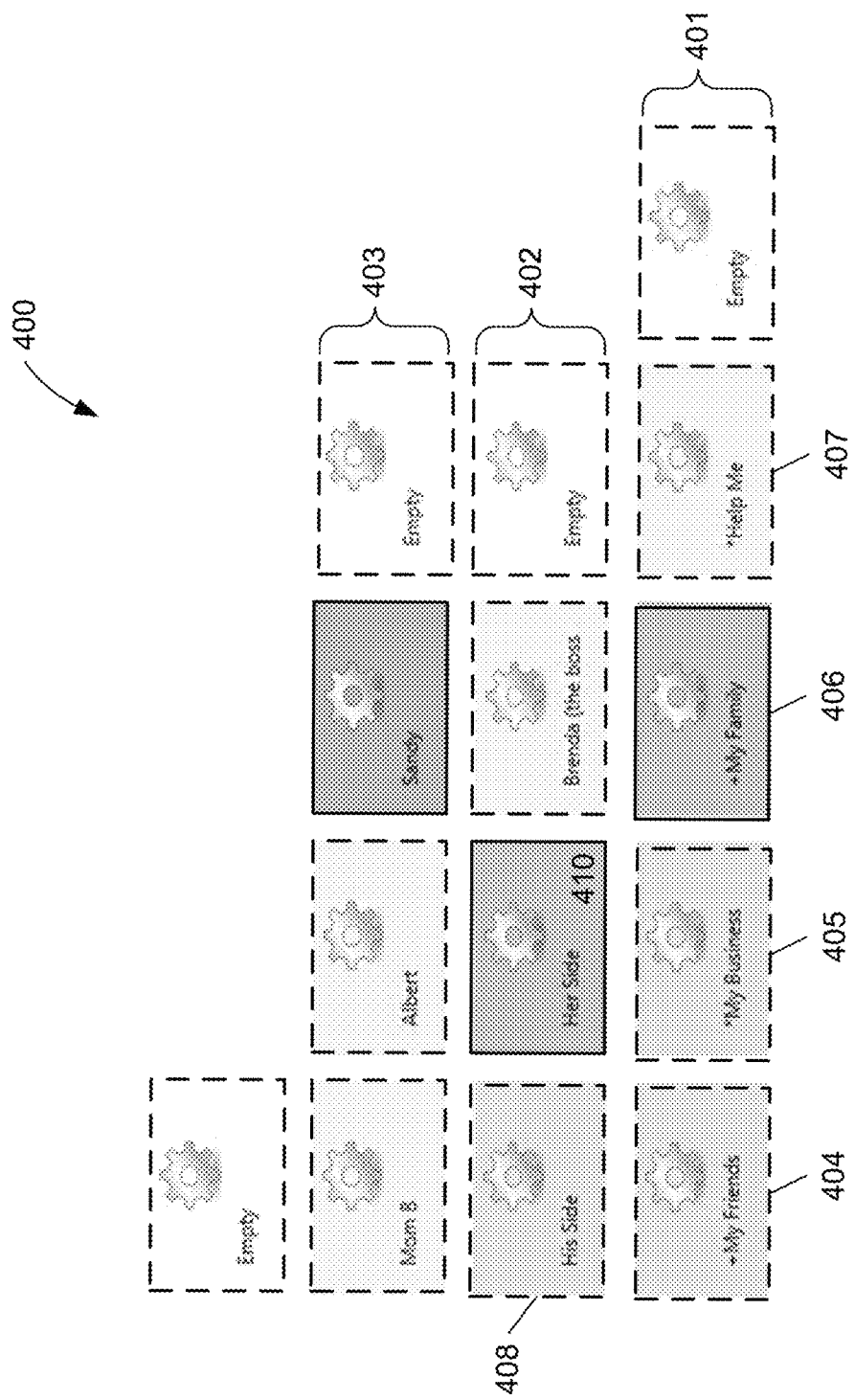

Note that when a context tile is selected, only context tiles that are associated with (e.g., child context tiles) the selected context tile are displayed as an upper row with respect to a lower row of the selected context tile. In the example as shown in FIG. 4A, when context tile 406 of bottom row 401 is selected, upper row 402 only shows the context tiles that are related to the selected context tile 406. Similarly, when context tile 408 is selected, upper row 403 only shows the context tiles that are associated with context tile 408. If a different context tile is selected in a lower row, different context tiles may be shown in an upper row. As shown in FIG. 4B, in this example, context tile 410 is selected in row 402, now its immediate upper row 403 only shows the context tiles that are associated with the selected context tile 410, replacing the context tiles associated with the previously selected context tile 408 (now unselected).

Figure 4C:
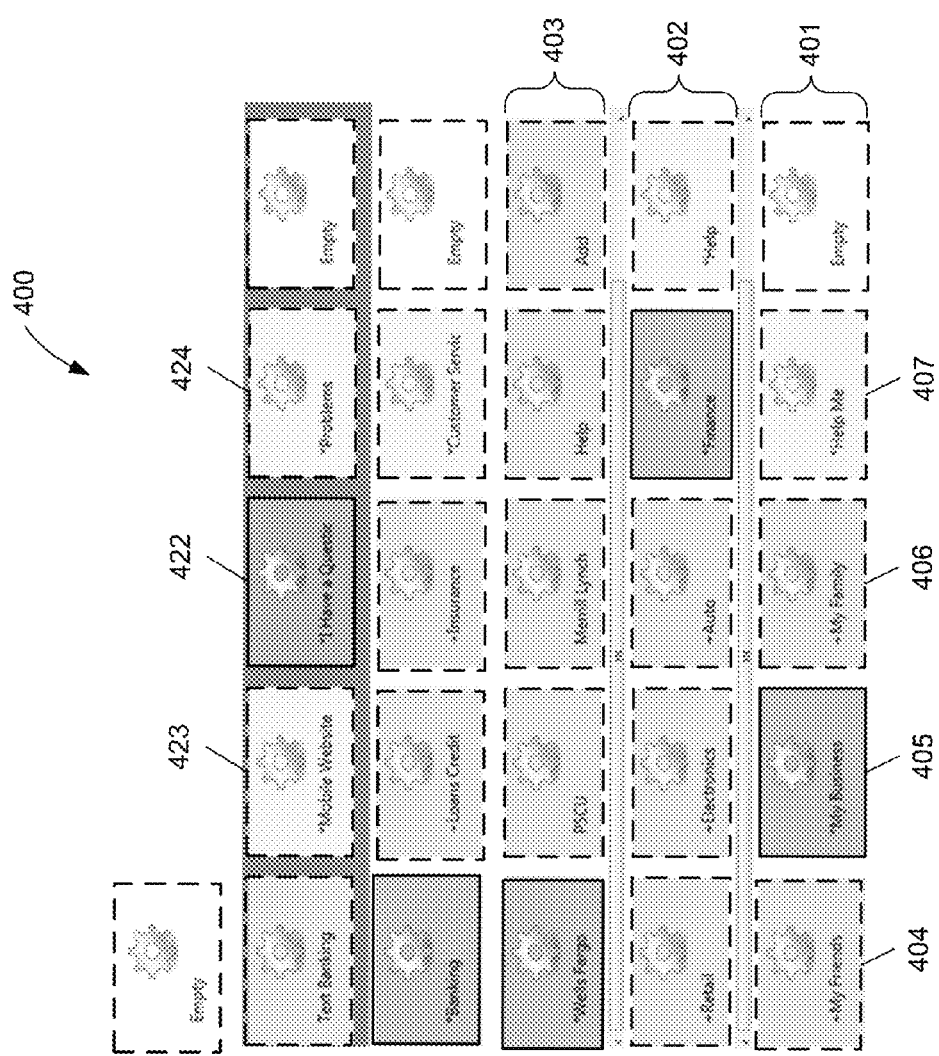

Similarly, as shown in FIG. 4C, the user can create a route sequence for "My Business" context tile 405. As described above, when context tile 405 is selected in bottom row 401, its immediate upper row 402 shows only context tiles that are associated with context tile 405, and so on. For each of the action context tiles, the user can edit its property to specify an action to be performed as shown in FIGS. 4D and 4E. Referring to FIGS. 4D and 4E, property 451 is associated with a master context. Property 452 is associated with context tile 422; property 453 is associated with context tile 423; and property 454 is associated with context tile 424. For example, for context tile 422, which is to ask a question, a user creating a sequence map can populate in property 452 of FIG. 4D to specify the initial question to be asked, a communication method override to be used (e.g., chat), a skill set of a service agent required and the buttons to display allowing a user to select (e.g. chat and voice) for support upchanneling to live support as needed. Upchanneling buttons can be displayed only when specific business rules are achieved such as; a user has not received an answer to a question submitted or a user has asked an inordinate number of questions and appear to be poking around the answer system. At this point they may need live support to address their needs. Subsequently, when context tile 422 is activated from an application, the service center can identify a service agent having the required skill set via the method override, establish a communication session (a chat session in this example), and post the predefined question as an initial question, all without requiring the user to specify at runtime.

Similarly, for context tile 423, which is to access a particular Web site, a user can populate in property 453 of FIG. 4E to specify a URL of the Web site, such that at runtime, the user does not have to specify the address. All the user needs at runtime is to activate the corresponding graphical representation of context tile 423 from its navigation application. Note that as shown in FIG. 4C, there can be many child context tiles of an upper row associated with a parent context tile of a lower row. The child context tiles of the upper row can be scrolled to show more context tiles while the corresponding parent context tile remains selected at the lower row.

FIGS. 5A-5E are screenshots illustrating a graphical user interface of a navigation application according to one embodiment of the invention. The graphical user interface (GUI) may be presented by application 103 of FIG. 2. According to one embodiment, when an application is launched, in this example, in a mobile device, the application connects with the service center for authentication (e.g., based on username/password or unique device ID). Once the application has been successfully authenticated, the application downloads a route sequence map from the service center that has been previously set up and configured using certain techniques described above.

Initially, information of context elements of the root level of a route sequence map is received at the client device via a published API. In this example, graphical representations of the context elements are displayed as the most inner or bottom row or ring 504 in a "stargate" model. A graphical representation can be an icon, a thumbnail image, a logo, etc. In this example, ring 504 includes multiple graphical representations such as "School," "Vendor," Family," "Support," "Friends," "Business," and "Nearby." A user can select any of these graphical representations, which may represent one of a navigation context element or an action context element. When the user selects a graphical representation, a message is transmitted from the application via a published API to the service center, where the message includes an identifier of the selected graphical representation. The service center can identify the corresponding context element (referred to herein as a selected context element) based on the identifier. If the selected context element is an action context element, the service center is to perform an action specified in a property of the selected context element.

Figures 11A, 11B:
FIGS. 11A and 11B are screenshots illustrating certain embodiments of a one-touch button according to one embodiment of the invention.

If the selected context element is a navigation context element, the service center identifies one or more child context elements associated with the selected context element. The service center returns data representing child context elements to the application via a published API. In this example, as shown in FIG. 5A, it is assumed that the user selects "Support" graphical representation, which may be displayed in an enlarged form, higher resolution, or a different color or shape, compared to the unselected graphical representations. Once the "Support" graphical representation is selected, the user can activate it by pressing the one-touch button 501. If it is defined as an action tile only, the center button will highlight when an action tile is reached allowing the user the ability to invoke the action as shown in FIGS. 11A and 11B. or alternatively, via a voice interactive command enabled by button 502. Other applications designed as navigator applications may not use the one-touch button and "launch" the action via some other user interface design. The information identifying the child context elements of the "Support" context element is then received from the service center and displayed via ring 505 of graphical representations. The graphical representations of ring 505 are displayed as an inner or upper ring while the selected graphical representation "Support" remains highlighted (e.g., enlarged in this example). The graphical representations of ring 505 can be scrolled, spun, or rotated, for example, by pressing the arrow buttons on either side of the ring 505 or by swiping using a finger on a touch sensitive screen.

Figure 5C:
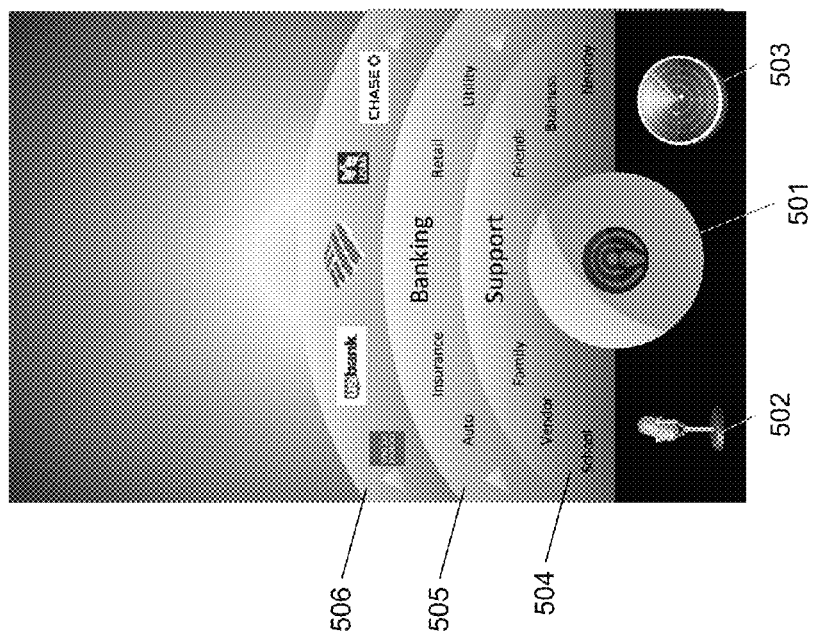
Figure 5E:
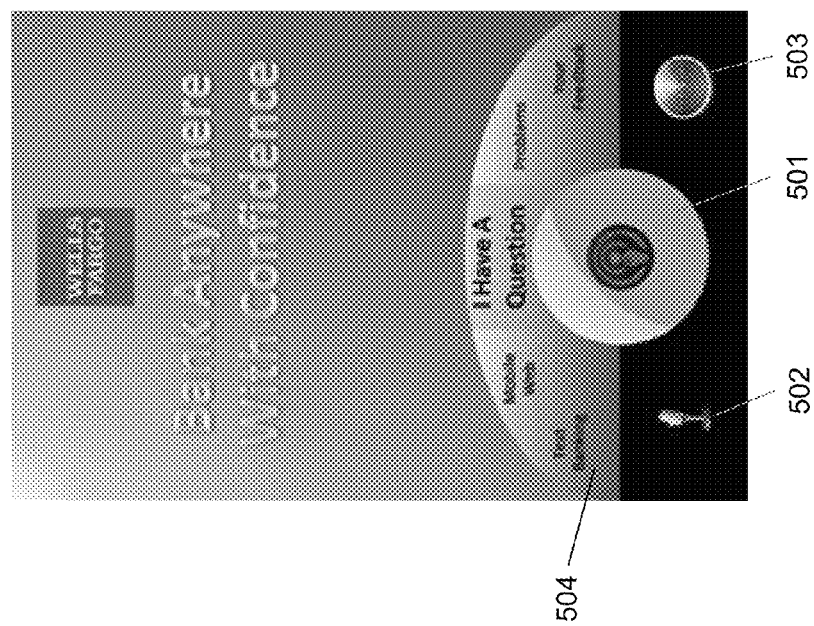

Similarly, as shown in FIG. 5C, when graphical representation "Banking" is selected from ring 505, its child context elements are identified and the corresponding graphical representations are displayed in an upper ring 506 and further ring 507, and so on. In addition, when graphical representation "Banking" is selected, ring 505 is spun to align the selected graphical representation with its parent selected graphical representation "Support." The user can further configure the behavior of the user interface via setting button 503. For example, the "stargate" model of GUI as shown in FIGS. 5A-5E can be configured into a donut launcher model, where the launch button can be configured at a lower left corner or lower right corner (e.g., dependent upon whether the user is a left-handed person or a right-handed person), as shown in FIGS. 6A-6D.

Figures 6A, 6B, 6C, 6D:
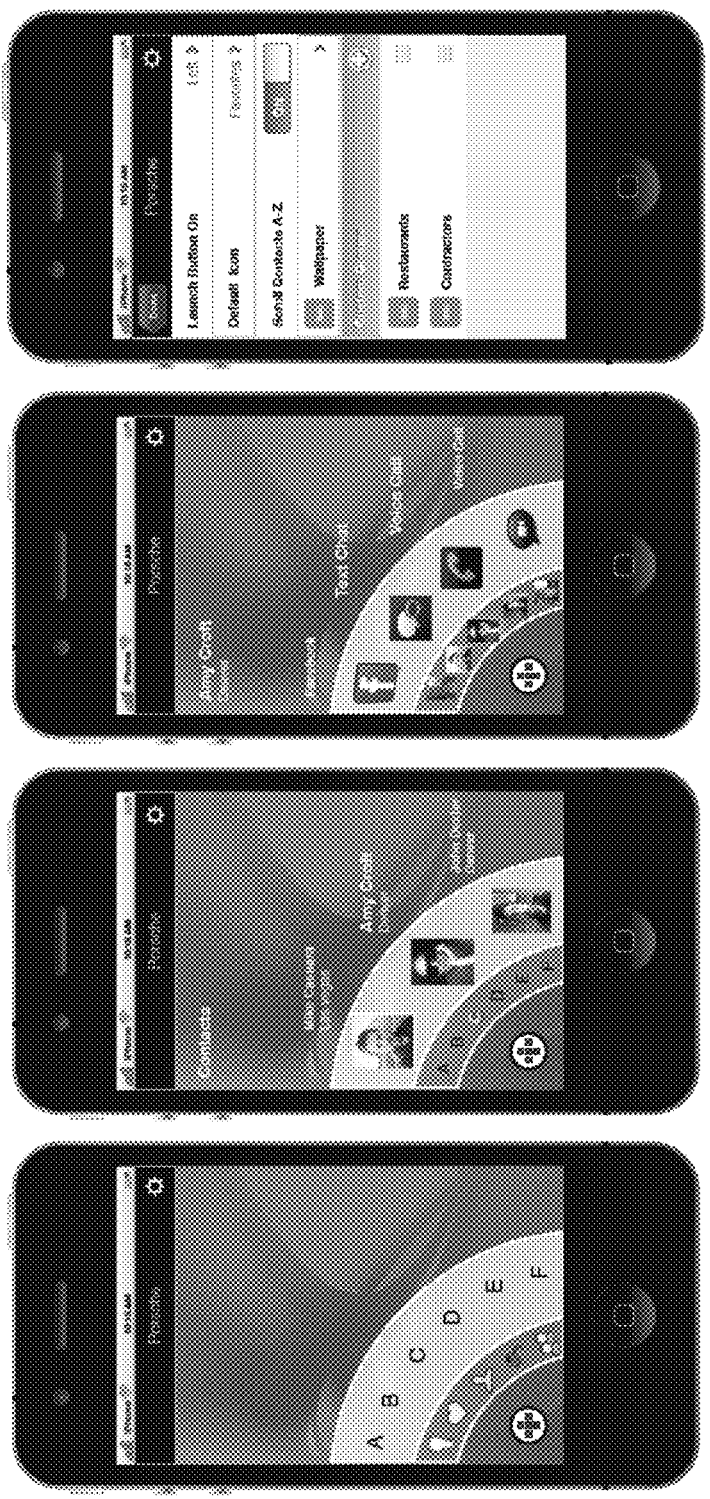
FIGS. 6A-6D are screenshots illustrating a graphical user interface of a navigation application according to another embodiment of the invention.

Referring to FIGS. 6A-6C, in one embodiment, only a predetermined number of rings are currently displayed, where the number of rings may be user configurable (or client configurable). In this example, only two rings of icons are displayed. When an icon is selected from a first ring as an inner ring, icons representing the child context elements of the selected context element are displayed in a second ring that is an outer ring with respect to the first ring, as shown in FIG. 6A. In addition, when an outer ring (e.g., A-to-Z scrolling ring) is displayed, the inner ring (e.g., the ring with icons) is displayed in a reduced resolution or a reduced size, while the outer ring is displayed in an enlarged resolution or enlarged size. Similarly, from the second ring (e.g., A-to-Z scrolling ring), if a graphical representation is selected, in this example, letter "C", a third ring having graphical representations (e.g., personal contacts associated with letter "C") is displayed as an outer ring. Meanwhile, the first ring disappears while the second ring is displayed in a reduced form, as shown in FIG. 6B.

FIG. 7 is a flow diagram illustrating a method for navigating resources of a service center based on a route sequence map according to one embodiment of the invention. Method 700 may be performed by route module 210 of route sequence manager 107 of FIG. 2. Referring to FIG. 7, at block 701, a command is received at a service center from a remote device (e.g., mobile device), where the service center provides support services to various users on behalf of clients. At block 702, based on the command, a context element of a route sequence map associated with a user of the remote device is identified. The context element is one of context elements of the route sequence map representing a route context of the user in a hierarchical structure. At block 703, it is determined whether the identified context element is a navigation context element or an action context element. If the identified context element is an action context element, at block 704, the service center performs an action that is specified in a property associated with the action context element. If the context element is a navigation context element, at block 705, processing logic retrieves from the route sequence map information representing one or more child context elements associated with the identified context element and transmits the information to the remote device to enable for display.

Figure 8:
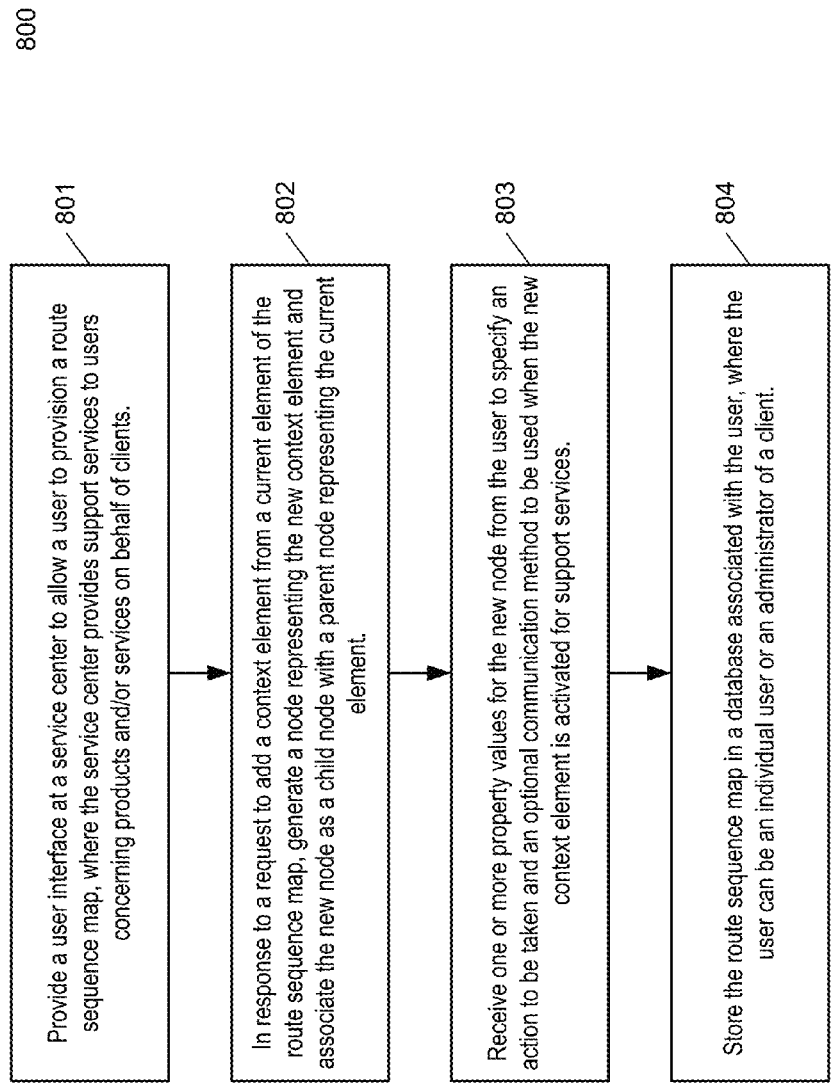
FIG. 8 is a flow diagram illustrating a method for creating a route sequence map according to one embodiment of the invention.

FIG. 8 is a flow diagram illustrating a method for creating a route sequence map according to one embodiment of the invention. Method 800 may be performed by configuration module 211 of route sequence manager 107 of FIG. 2. Referring to FIG. 8, at block 801, a user interface such as a Web interface of a service center is provided to allow a user to provision a route sequence map. At block 802, in response to a request to add a context element from a current context element of the route sequence map, processing logic generates a node representing the new context element and associate the new node as a child node to a parent node representing the current context element. At block 803, processing logic receives one or more property values from the user for the new node to specify an action to be taken and an optional communication method to be used when the new context element is activated for support services. The above processes may be iteratively performed for every new context element to be added. At block 804, the route sequence map is stored in a database associated with the user, where the user can be an individual user or an administrator of a corporate client.

Figure 9:
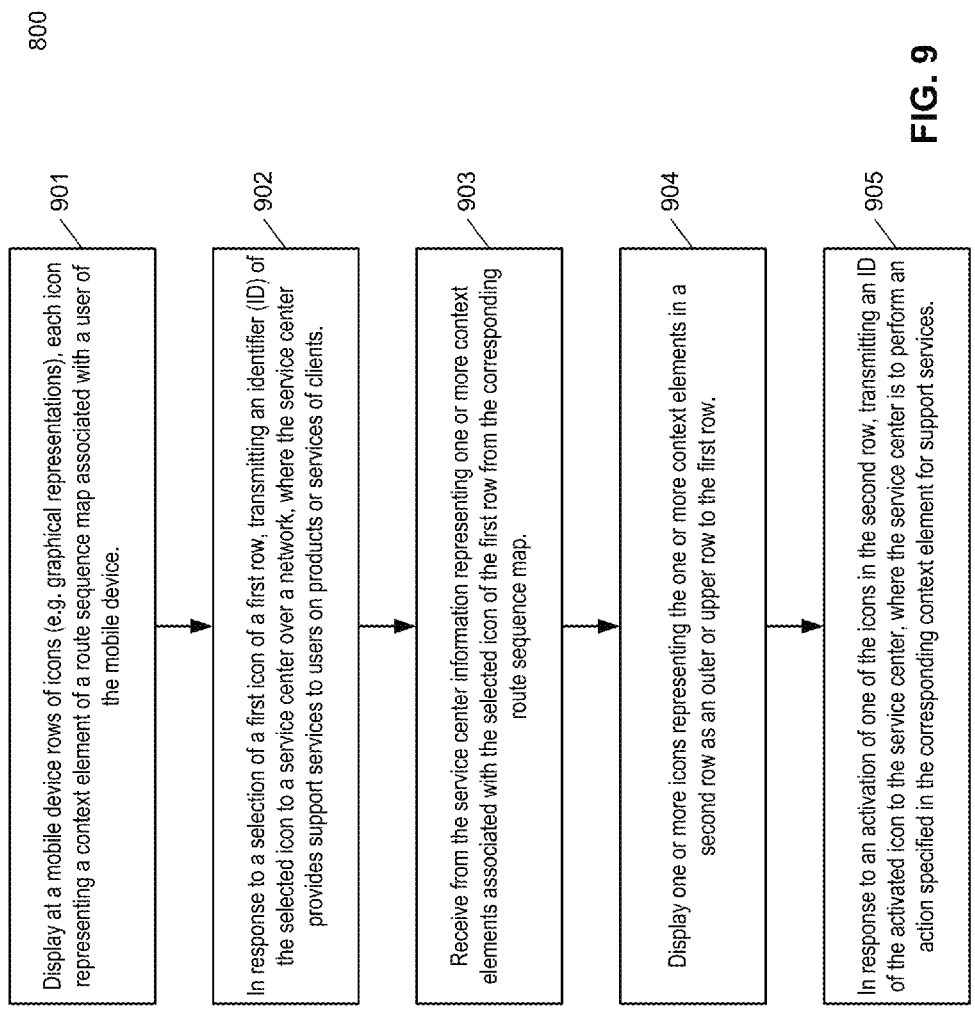
FIG. 9 is a flow diagram illustrating a method for navigating resources of a service center based on a route sequence map according to one embodiment of the invention.

FIG. 9 is a flow diagram illustrating a method for navigating resources of a service center based on a route sequence map according to one embodiment of the invention. Method 900 may be performed by application 103 of FIG. 2. Referring to FIG. 9, at block 901, processing logic displays, at a mobile device, rows of graphical representations (e.g., icons, thumbnail images, and logos), each graphical representation representing a context element of a route sequence map associated with a user of the mobile device. At block 902, in response to a selection of a first graphical representation of a first row or ring, an ID of the selected graphical representation is transmitted to a service center over a network, where the service center provides support services to users on products or services of clients. At block 903, processing logic receives from the service center information representing one or more context elements associated with the selected context element corresponding to the selected graphical representation of the first row. At block 904, one or more graphical representations corresponding to the one or more context elements are then displayed in a second row as an outer or upper row with respect to the first row. In response to an activation of one of the graphical representations in the second row, at block 905, processing logic transmits an ID of the activated graphical representation to the service center, where the service center is to perform an action specified in the corresponding context element for support services.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for presenting media content at an electronic device, the method comprising:

displaying a first row of a plurality of graphical representations at the electronic device, each of the graphical representations corresponding to a context element of a route sequence map associated with a first user of the electronic device and received from a server that provides content services to a plurality of users on a plurality of content items on behalf of a plurality of content providers over a network, wherein the route sequence map includes a plurality of context elements organized in a hierarchical structure, each context element having one or more property values specifying at least one of an action to be performed by the server and a link to zero or more child context elements in the hierarchical structure;

in response to a selection of a first graphical representation from the first row corresponding to a first context element, transmitting a first message having at least a first identifier (ID) of the first graphical representation to the server over the network;

receiving a second message from the server in response to the first message, the second message including data identifying a second row of context elements of the route sequence map, wherein the second row of context elements is identified by the server based on the first ID identifying the first context element of the route sequence map as child context elements with respect to the first context element; and displaying a second row of graphical representations representing the second row of context elements, wherein the second row of the graphical representations is displayed as an outer row relative to the first row as an inner row, while the first graphical representation is highlighted in the first row.

2. The method of claim 1, wherein the electronic device is a mobile device and the first and second rows of graphical representations are displayed by a mobile application executed within the mobile device, and wherein the method further comprises:

in response to launching the mobile application in the mobile device, transmitting a user credential of the first user to the server over the network for authenticating the first user;

receiving the route sequence map associated with the first user from the server in response to successful authentication of the first user, wherein the route sequence map is retrieved from a user account of the first user maintained by the server; and displaying one or more graphical representations of a root level of the route sequence map prior to displaying the first row of the graphical representations.

3. The method of claim 1, further comprising:

in response to a selection of a second graphical representation from the first row corresponding to a second context element, transmitting a third message having at least a second ID of the second graphical representation to the server over the network;

receiving a fourth message from the server in response to the third message, the fourth message including data identifying a third row of context elements of the route sequence map, wherein the third row of context elements is identified by the server based on the second ID identifying the second context element of the route sequence map as child context elements with respect to the second context element; and displaying a third row of graphical representations representing the third row of context elements, replacing the second row of graphical representations, while the second graphical representation is highlighted in the first row, wherein third row includes at least one graphical representation that is different than the second row.

4. The method of claim 1, further comprising:

in response to a selection of a third graphical representation from the first row, transmitting a third ID of the third graphical representation to the server over the network, wherein the third graphical representation corresponds to a third context element of route sequence map, the third graphical representation representing a second user;

receiving a fifth message from the server, the fifth message including contact information of the second user and a preferred communication method to reach the second user; and establishing a communication session between the first user and the second user using the preferred communication method specified by the fifth message.

5. The method of claim 4, wherein the second user is a support agent associated with the server, the support agent having a skill set specified in a property value of the third context element.

6. The method of claim 4, further comprising displaying information indicating current availability of the second user as part of the third graphical representation.

7. The method of claim 1, further comprising in response to a user input for navigating the second row, scrolling the graphical representations of the second row, while the graphical representations of the first row remain steady and the first graphical representation remains highlighted.

8. The method of claim 1, wherein the second row of the graphical representations is displayed as an upper row, while the first row of the graphical representations is displayed as a lower row below the second row.

9. The method of claim 1, wherein the second row of the graphical representations is displayed as an outer row of a ring structure, while the first row of the graphical representations is displayed as an inner row of the ring structure.

10. A non-transitory machine-readable medium having instructions stored therein, which when executed by a processor, cause the processor to perform operations of presenting media content at an electronic device, the operations comprising:

displaying a first row of a plurality of graphical representations at the electronic device, each of the graphical representations corresponding to a context element of a route sequence map associated with a first user of the electronic device and received from a server that provides content services to a plurality of users on a plurality of content items on behalf of a plurality of content providers over a network, wherein the route sequence map includes a plurality of context elements organized in a hierarchical structure, each context element having one or more property values specifying at least one of an action to be performed by the server and a link to zero or more child context elements in the hierarchical structure;

in response to a selection of a first graphical representation from the first row corresponding to a first context element, transmitting a first message having at least a first identifier (ID) of the first graphical representation to the server over the network;

receiving a second message from the server in response to the first message, the second message including data identifying a second row of context elements of the route sequence map, wherein the second row of context elements is identified by the server based on the first ID identifying the first context element of the route sequence map as child context elements with respect to the first context element; and displaying a second row of graphical representations representing the second row of context elements, wherein the second row of the graphical representations is displayed as an outer row relative to the first row as an inner row, while the first graphical representation is highlighted in the first row.

11. The non-transitory machine-readable medium of claim 10, wherein the electronic device is a mobile device and the first and second rows of graphical representations are displayed by a mobile application executed within the mobile device, and wherein the operations further comprise:

in response to launching the mobile application in the mobile device, transmitting a user credential of the first user to the server over the network for authenticating the first user;

receiving the route sequence map associated with the first user from the server in response to successful authentication of the first user, wherein the route sequence map is retrieved from a user account of the first user maintained by the server; and displaying one or more graphical representations of a root level of the route sequence map prior to displaying the first row of the graphical representations.

12. The non-transitory machine-readable medium of claim 10, wherein the operations further comprise:

in response to a selection of a second graphical representation from the first row corresponding to a second context element, transmitting a third message having at least a second ID of the second graphical representation to the server over the network;

receiving a fourth message from the server in response to the third message, the fourth message including data identifying a third row of context elements of the route sequence map, wherein the third row of context elements is identified by the server based on the second ID identifying the second context element of the route sequence map as child context elements with respect to the second context element; and displaying a third row of graphical representations representing the third row of context elements, replacing the second row of graphical representations, while the second graphical representation is highlighted in the first row, wherein third row includes at least one graphical representation that is different than the second row.

13. The non-transitory machine-readable medium of claim 10, wherein the operations further comprise:

in response to a selection of a third graphical representation from the first row, transmitting a third ID of the third graphical representation to the server over the network, wherein the third graphical representation corresponds to a third context element of route sequence map, the third graphical representation representing a second user;

receiving a fifth message from the server, the fifth message including contact information of the second user and a preferred communication method to reach the second user; and establishing a communication session between the first user and the second user using the preferred communication method specified by the fifth message.

14. The non-transitory machine-readable medium of claim 13, wherein the second user is a support agent associated with the server, the support agent having a skill set specified in a property value of the third context element.

15. The non-transitory machine-readable medium of claim 13, wherein the operations further comprise displaying information indicating current availability of the second user as part of the third graphical representation.

16. The non-transitory machine-readable medium of claim 10, wherein the operations further comprise in response to a user input for navigating the second row, scrolling the graphical representations of the second row, while the graphical representations of the first row remain steady and the first graphical representation remains highlighted.

17. The non-transitory machine-readable medium of claim 10, wherein the second row of the graphical representations is displayed as an upper row, while the first row of the graphical representations is displayed as a lower row below the second row.

18. The non-transitory machine-readable medium of claim 10, wherein the second row of the graphical representations is displayed as an outer row of a ring structure, while the first row of the graphical representations is displayed as an inner row of the ring structure.

19. An electronic device, comprising:

a processor; and a memory coupled to the processor for storing instructions, which when executed from the memory, cause the processor to perform operations, the operations including displaying a first row of a plurality of graphical representations at the electronic device, each of the graphical representations corresponding to a context element of a route sequence map associated with a first user of the electronic device and received from a server that provides content services to a plurality of users on a plurality of content items on behalf of a plurality of content providers over a network, wherein the route sequence map includes a plurality of context elements organized in a hierarchical structure, each context element having one or more property values specifying at least one of an action to be performed by the server and a link to zero or more child context elements in the hierarchical structure, in response to a selection of a first graphical representation from the first row corresponding to a first context element, transmitting a first message having at least a first identifier (ID) of the first graphical representation to the server over the network, receiving a second message from the server in response to the first message, the second message including data identifying a second row of context elements of the route sequence map, wherein the second row of context elements is identified by the server based on the first ID identifying the first context element of the route sequence map as child context elements with respect to the first context element, and displaying a second row of graphical representations representing the second row of context elements, wherein the second row of the graphical representations is displayed as an outer row relative to the first row as an inner row, while the first graphical representation is highlighted in the first row.

20. The electronic device of claim 19, wherein the electronic device is a mobile device and the first and second rows of graphical representations are displayed by a mobile application executed within the mobile device, and wherein the operations further comprise:

in response to launching the mobile application in the mobile device, transmitting a user credential of the first user to the server over the network for authenticating the first user;

receiving the route sequence map associated with the first user from the server in response to successful authentication of the first user, wherein the route sequence map is retrieved from a user account of the first user maintained by the server; and displaying one or more graphical representations of a root level of the route sequence map prior to displaying the first row of the graphical representations.

21. The electronic device of claim 19, wherein the operations further comprise:

in response to a selection of a second graphical representation from the first row corresponding to a second context element, transmitting a third message having at least a second ID of the second graphical representation to the server over the network;

receiving a fourth message from the server in response to the third message, the fourth message including data identifying a third row of context elements of the route sequence map, wherein the third row of context elements is identified by the server based on the second ID identifying the second context element of the route sequence map as child context elements with respect to the second context element; and displaying a third row of graphical representations representing the third row of context elements, replacing the second row of graphical representations, while the second graphical representation is highlighted in the first row, wherein third row includes at least one graphical representation that is different than the second row.

22. The electronic device of claim 19, wherein the operations further comprise:

in response to a selection of a third graphical representation from the first row, transmitting a third ID of the third graphical representation to the server over the network, wherein the third graphical representation corresponds to a third context element of route sequence map, the third graphical representation representing a second user;

receiving a fifth message from the server, the fifth message including contact information of the second user and a preferred communication method to reach the second user; and establishing a communication session between the first user and the second user using the preferred communication method specified by the fifth message.

\* \* \* \* \*